United States Patent
Schultz et al.

(10) Patent No.: US 7,275,142 B1
(45) Date of Patent: Sep. 25, 2007

(54) STORAGE LAYOUT AND DATA REPLICATION

(75) Inventors: Margaret E. Schultz, Seattle, WA (US); Debra H. Graham, Seattle, WA (US)

(73) Assignee: VERITAS Operating Corporation, Cupertino, CA (US)

(*) Notice: Subject to any disclaimer, the term of this patent is extended or adjusted under 35 U.S.C. 154(b) by 435 days.

(21) Appl. No.: 10/898,794

(22) Filed: Jul. 26, 2004

(51) Int. Cl.
*G06F 12/00* (2006.01)

(52) U.S. Cl. ..................................... 711/162
(58) Field of Classification Search ................ 711/162, 711/114; 707/204; 714/6
See application file for complete search history.

(56) References Cited

U.S. PATENT DOCUMENTS

| | | | |
|---|---|---|---|
| 6,347,366 | B1 | 2/2002 | Cousins |
| 6,519,679 | B2 | 2/2003 | Devireddy et al. |
| 6,538,669 | B1 | 3/2003 | Lagueux, Jr. et al. |
| 6,629,158 | B1 | 9/2003 | Brant et al. |
| 6,654,797 | B1 | 11/2003 | Kamper |
| 6,751,739 | B1 | 6/2004 | Verdun |
| 7,069,410 | B2 * | 6/2006 | McBrearty et al. ......... 711/202 |
| 2002/0129216 | A1 | 9/2002 | Collins |
| 2003/0046270 | A1 | 3/2003 | Leung et al. |
| 2005/0015407 | A1 * | 1/2005 | Nguyen et al. ............. 707/200 |

OTHER PUBLICATIONS

U.S. Appl. No. 10/388,193, filed Mar. 2003, Knight.
"Performance and Capacity Planning Solutions", © 1999 Compaq Computer Cooperation.

* cited by examiner

*Primary Examiner*—Hiep T. Nguyen
(74) *Attorney, Agent, or Firm*—Meyertons Hood Kivlin Kowert & Goetzel, P.C.; Jeffrey C. Hood

(57) ABSTRACT

Various embodiments of volume replication are disclosed. A request may be received to replicate a storage layout of a first storage system to a second storage system. A storage layout (e.g., configuration) of the first storage system may be determined, and one or more storage options of the second storage system may be determined. The storage options of the second storage system may include one or more storage devices available to the second storage system. A storage layout for the second storage system may be determined based on the storage options of the second storage system and the storage layout of the first storage system. Determining the storage layout of the second storage system may be based on the user input. The determined storage layout for the second storage system may be implemented, and data from the first storage system may be replicated onto the second storage system.

31 Claims, 23 Drawing Sheets

Replicate Storage of
Source Storage System
to
Target Storage System

STORAGE LAYOUT AND DATA REPLICATION

BACKGROUND OF THE INVENTION

1. Field of the Invention

This invention relates to data replication and, more particularly, to replication of one or more volumes in a storage system.

2. Description of the Related Art

Various companies implement disaster recovery plans and/or systems to protect against a complete loss of a storage system. Some disaster recover plans and/or systems include an ability to eliminate a possibility of having large amounts of data loss within a storage system. For years, various companies have made regular data backups at the primary storage system (i.e., primary data center) by producing tape-backups on a regular basis for shipment to an offsite or secondary storage system (i.e., secondary data center). A tape-based backup solution can be utilized for some applications, while other applications, e.g., email, database, etc., need a faster system and/or method than shipping tape-based backups to a secondary data center.

Some faster systems include replicating data from the primary storage system to the secondary storage system across a network. In general, replicating data from the primary storage system to the secondary storage system across the network can be automated and may depend on a set of rules. This may reduce opportunities for human error and/or minimize a need for administrator intervention and/or interaction.

Typically, in more flexible storage systems, one or more storage virtualizations such as volumes can be used. In general, a volume may not depend on specific hardware storage devices, e.g., hard drives, arrays of hard drives, storage area networks, etc. available in a storage system, and a volume may include storage on a portion of storage space of one or more storage devices available in a storage system.

When data replication is performed from a primary storage system to a secondary storage system, the primary storage system may include a different set of storage devices than the secondary storage system. This may increase a level of complexity and/or challenges when replicating a volume included in the primary storage system to a volume of the secondary storage system. In particular, a difficult task in configuring servers for volume replication is the tedious and complex task of creating volumes of identical size and name (yet possibly on diverse or varying hardware) on one or more secondary servers.

Therefore, there exists a need to automate and/or provide a method and system to reduce the complexities and/or challenges associated with replicating one or more volumes from a primary storage system to a secondary storage system.

SUMMARY OF THE INVENTION

Various embodiments of volume replication are disclosed. In some embodiments, a request may be received to replicate a storage layout of a first storage system to a second storage system. For example, the first storage system may be a primary storage system and the second storage system may be a secondary storage system. For instance, the first and second storage systems may be included in a disaster recover plan, system, and/or method.

After receiving the replication request, a storage layout (e.g., configuration) of the first storage system may be determined. For example, the storage layout may be included in a configuration data structure and/or file, among others. In an another embodiment, software may analyze the first storage system and programmatically determine the storage layout of the first storage system.

Software may also determine and/or discover various storage options of the secondary storage system. The storage options of the second storage system may include one or more storage devices available to the second storage system. For example, a storage device available to the second storage system may include various types of non-volatile storage or memory such as a magnetic media (e.g., a hard drive), a redundant array of independent drives (RAID), a JBOD (just a bunch of drives) configuration, and/or a SAN (Storage Area Network), among others.

The software may then perform various operations to determine an "optimal" storage layout for the second storage system. The software may determine the "optimal" storage layout for the second storage system based on the storage layout of the first storage system and storage options of the second storage system. Here, the term "optimal" simply means "very good" according to some metric. In some embodiments, determining an optimal storage layout for second storage system may or may not be based on user input.

In various embodiments, the software may also use constraints received from the user. A graphical user interface (GUI) may be implemented, and the user may interact with the software. For example, the user may provide user input (e.g., constraints) to indicate that one or more of the storage devices of the second storage system may and/or may not be used for volume replication. The "optimal" storage layout for the second storage system may be determined at least in part based on the user input received through the GUI.

Determining the "optimal" storage layout for the second storage system may include determining a "minimum" (e.g., "least expensive") resource allocation (e.g., allocated storage spaces and/or storage devices) for each volume to be replicated. If the software succeeds in finding an "inexpensive" or "minimal" volume configuration for every volume to be replicated, then the software may perform an "improvement pass" for each volume to be replicated. The improvement pass may go through one volume to be replicated at a time, release all the reserved (i.e., allocated) storage space(s) for that volume, and then it may attempt to create a volume layout starting with the "most expensive" volume types, and working its way to the "least expensive". This will produce at least as good of a layout as the starting layout, and the layout may be improved.

In various embodiments, the optimal storage layout may be shown iconically in a diagram. For example, a storage configuration diagram may be displayed which includes icons for each of the storage units, e.g., storage systems, drives, storage devices, storage spaces, drive arrays, SANs, etc., and the optimal storage layout may be graphically and/or iconically depicted. The user may graphically manipulate the displayed storage layout to make modifications to the storage layout. For example, if the optimal storage layout is displayed graphically or iconically, the user may use various drag and drop techniques, cut-and-paste techniques, check-box techniques, or other graphical editing techniques to change the optimal storage layout for second storage system, as desired. In some embodiments, the determined optimal storage layout for second storage system may not modifiable by the user.

After the storage layout has been determined for the second storage system, the determined storage layout may be implemented on the second storage system. In other words, the various storage devices in the second storage system may be configured according to the determined layout. Data from the first storage system may then be replicated onto the second storage system. For example, data from the replicated volumes of the first storage system may be transferred to the replicated volumes of the second storage system.

In some embodiments, if a change is detected in one of the volumes of the first storage system (volumes that are replicated onto the second storage system), the change may be automatically or programmatically made to the second storage system. For example, the change may be associated with a data modification operation (e.g., write, remove, create, rename, grow, shrink, etc.). In various embodiments, changes may be continually detected on the first storage system and automatically made on the second storage system.

Figure 1A:
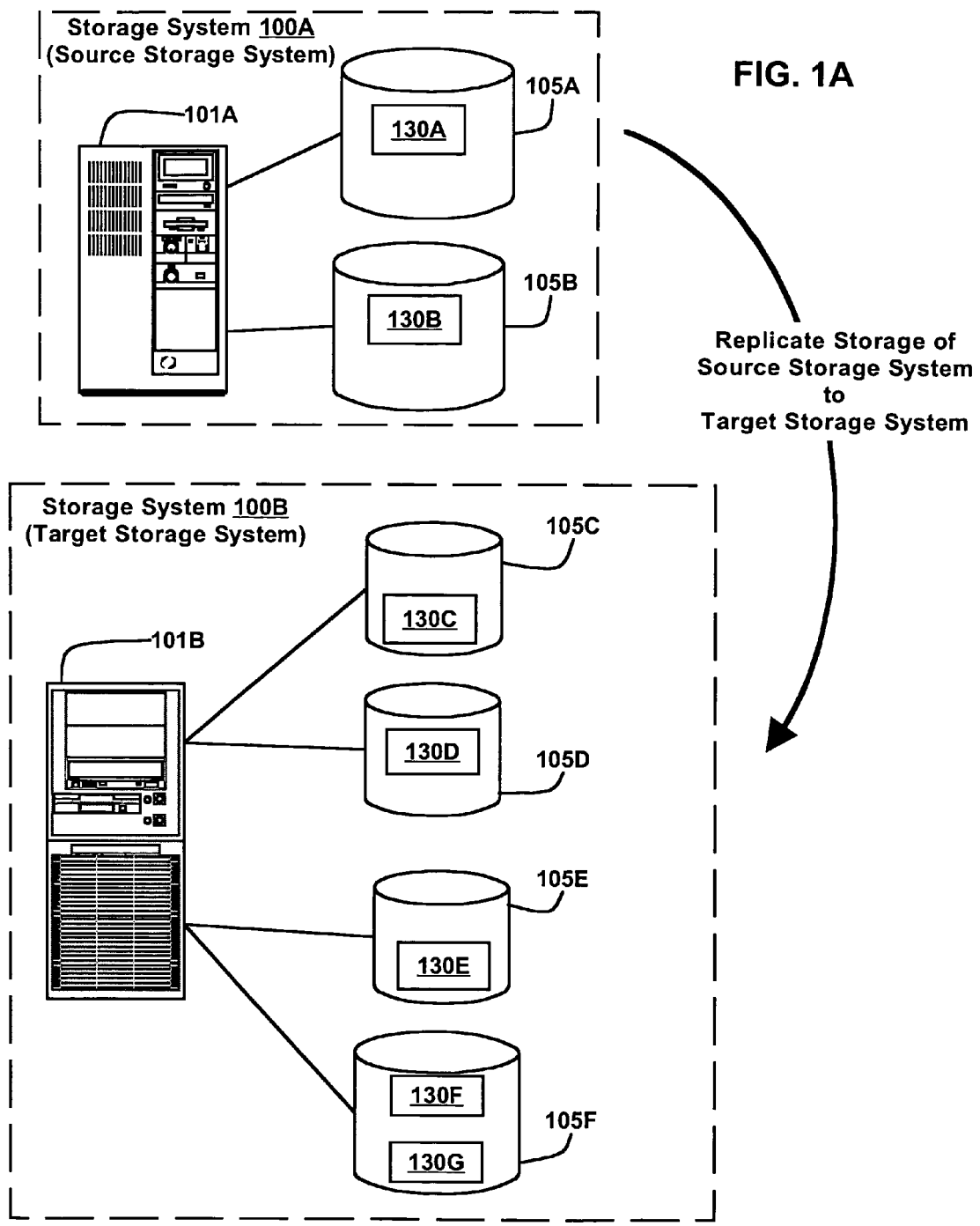
FIGS. 1A and 1B are block diagrams of storage systems, according to various embodiments.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Incorporation by Reference

U.S. Provisional Patent Application Ser. No. 60/348,870 titled "Storage Configurator" and filed on Jan. 14, 2002, whose inventors is Margaret E. Knight, is hereby incorporated by reference in its entirety as though fully and completely set forth herein.

U.S. patent application Ser. No. 10/327,561 titled "Storage Configurator For Determining An Optimal Storage Configuration For An Application" and filed on Dec. 20, 2002, whose inventor is Margaret E. Knight, is hereby incorporated by reference in its entirety as though fully and completely set forth herein.

U.S. patent application Ser. No. 10/388,193 titled "Generalized Architecture For Automatic Storage Configuration For Diverse Server Applications" and filed on Mar. 13, 2003, whose inventor is Margaret E. Knight, is hereby incorporated by reference in its entirety as though fully and completely set forth herein.

Terms

The following are some terms used in the present application:

Computer System—any of various types of computing or processing systems, including a mainframe computer system, workstation, network appliance, Internet appliance, grid computing system, or other device or combinations of devices. In general, the term "computer system" can be broadly defined to encompass any device (or combination of devices) having at least one processor that executes instructions from a memory medium.

Memory Medium—Any of various types of memory devices or storage devices. The term "memory medium" is intended to include various types of memory or storage, including an installation medium, e.g., a CD-ROM, or floppy disks, a random access memory or computer system memory such as DRAM, SRAM, EDO RAM, Rambus RAM, NVRAM, EPROM, EEPROM, flash memory etc., or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. The memory medium may also be a distributed memory medium, e.g., for security reasons, where a portion of the data is stored on one memory medium and the remaining portion of the data may be stored on a different memory medium. Also, the memory medium may be one of the networks to which the current network is coupled, e.g., a SAN (Storage Area Network).

Carrier Medium—a memory medium as described above, as well as signals such as electrical, electromagnetic, or digital signals, conveyed via a communication medium such as a bus, network and/or a wireless link.

FIG. 1—Replicating a Storage System

FIG. 1A is an exemplary block diagram illustrating a source (e.g., primary) storage system 100A and a target (e.g., secondary) storage system 100B, according to various embodiments. It is noted that various source and target storage systems may be used. Storage system 100A may include computer system 101A, and storage system 100B may include computer system 101B.

In various embodiments, storage system 100A may include storage devices 105A-105B coupled to computer system 101A, and storage system 100B may include storage devices 105C-105F coupled to computer system 101B. Some embodiments of a storage device 105 may include non-volatile memory such as a magnetic media, e.g., a hard drive and/or optical storage. Storage device 105 may include other types of memory as well, and/or combinations thereof, such as a redundant array of independent drives (RAID) and/or a JBOD (just a bunch of drives) configuration. Further, storage device 105 may be or include one or more networks to which computer system (e.g., computer system 101A, 101B, and/or another computer system which is not shown) is coupled, e.g., a SAN (Storage Area Network). In various embodiments, computer system 101 may be coupled to storage device 105 by SCSI (small computer system interface), IEEE 1394, universal serial bus (USB), Ethernet, fibre channel and/or any combinations of these, among others.

Figure 1B:
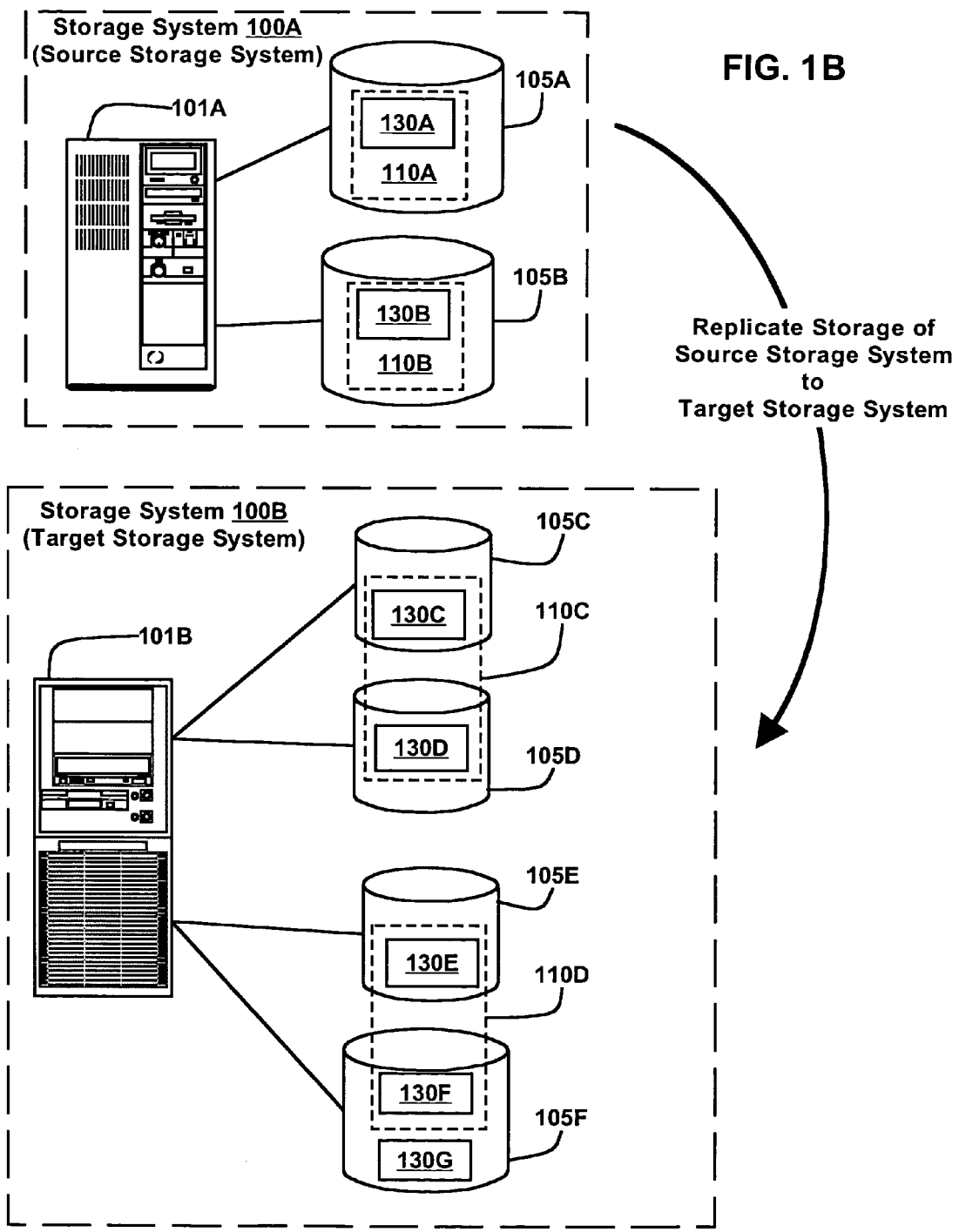

Computer systems 101A and/or 101B may store and execute volume manager (VM) software. VM software may allow computer systems 101A-101B to each implement and/or use one or more volumes. Volumes may include storage spaces 130 on one or more storage devices 105. For example, storage devices 105A and 105B may include storage spaces 130A and 130B, respectively. In various embodiments, a storage space 130 may include at least a portion of storage device 105. As shown in FIG. 1B, volumes 110A and 110B may be implemented to include storage spaces 130A and 130B, respectively.

In various embodiments, volumes 110A-110B may store various data objects of one or more applications. For example, volume 110A may be implemented and may store a data object of an application (e.g., Microsoft Exchange, SQL Server, Oracle Database, etc.). For instance, the data object may be a transaction log. Volume 110B may be implemented and store a second data object of the application, such as a database. As examples, volume 110A may be a transaction log volume (TLV) which is dedicated to the transaction log, and volume 110B may be a database volume (DBV) which is dedicated to the database. A storage layout (also called a "storage configuration" or simply "layout") of storage system 100A may include configuration information (e.g., rules, definitions, etc.) for volumes 110A-110B, and volumes 110A-110B may be an implementation of the storage layout of storage system 100A.

In order to replicate data from source (e.g., primary) storage system 100A to target (e.g., secondary) storage system 100B, it may be desirable to replicate one or more volumes of storage system 100A onto storage system 100B. In various embodiments, software, such as storage configurator 178 (FIG. 6), may be executable to determine a storage layout for storage system 100B that effectively replicates the one or more volumes of storage system 100A onto storage system 100B. Thus, according to various embodiments, a storage layout may be automatically (i.e., programmatically) created for target storage system 100B. This automatic (i.e., programmatic) determination of the storage layout for target storage system 100B may remove the burden of a system administrator (e.g., a user) having to manually configure the volumes on target storage system 100B.

Information regarding the storage layout of storage system 100A and possibly available storage spaces 130C-130G may be used for determining the storage layout of target storage system 100B, e.g., volumes 110C-110D. For instance, as shown in FIG. 1B, storage devices 105C and 105D may include storage spaces 130C and 130D respectively, and storage spaces 130C and 130D may be used to implement volume 110C. Storage device 105E may include storage space 130E, and storage device 105F may include storage spaces 130F-130G. Storage spaces 130E-130F may be used to implement volume 110D. When the storage layout for target storage system 100B has been determined and implemented on target storage system 100B, volumes 110A and 110B of source storage system 100A have been replicated onto volumes 110C and 110D of target storage system 100B, respectively.

Figure 2:
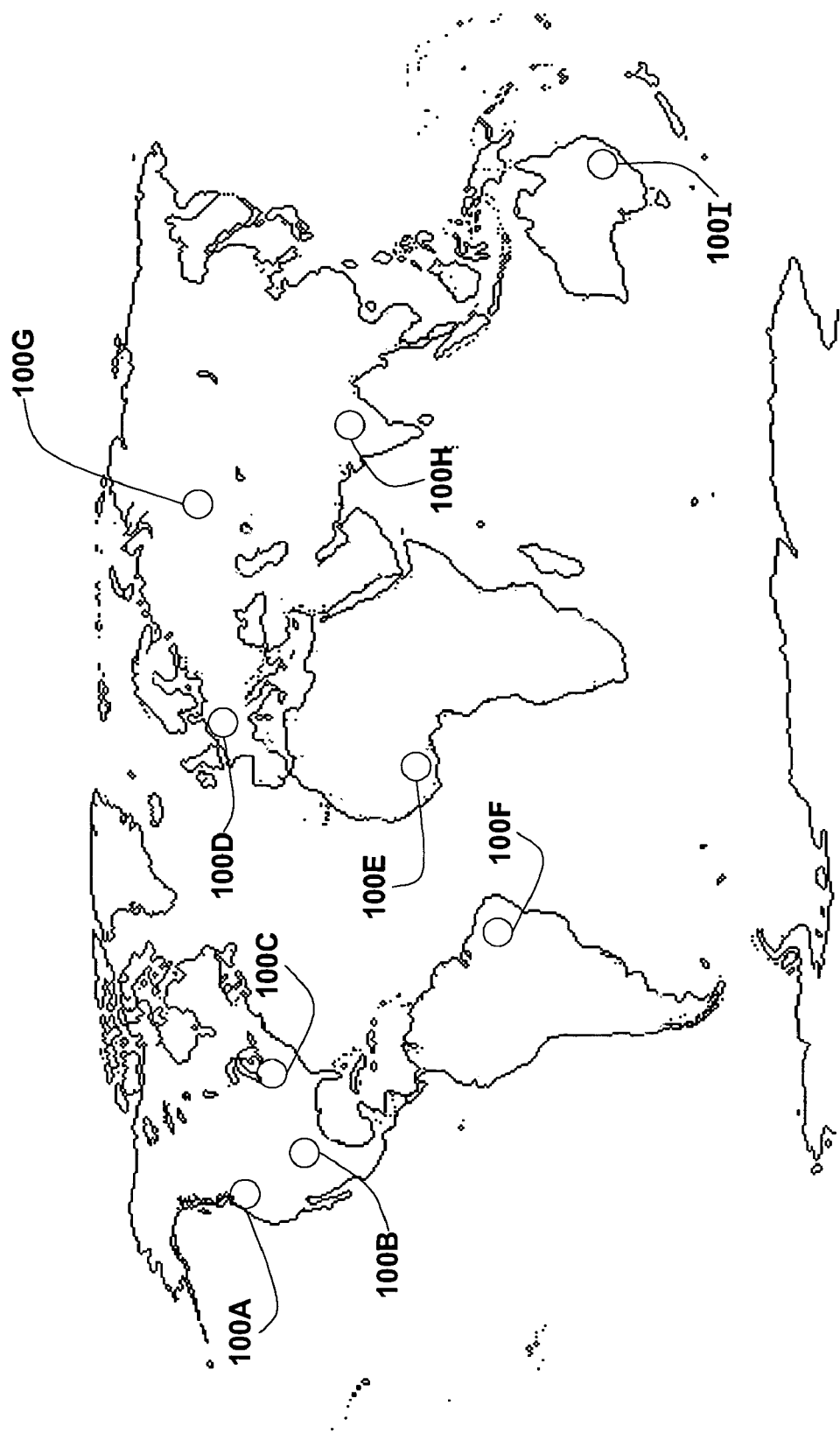
FIG. 2 is a diagram illustrating a distribution of storage systems, according to various embodiments.

FIG. 2—Storage System Distribution

FIG. 2 illustrates storage systems distributed in various geographic areas, according to various embodiments. In various embodiments, storage system 100A may be replicated to one or more storage systems distributed across a country or a continent, such as one or more of storage systems 100B-100C. In some embodiments, storage system 100A may be replicated to one or more storage systems distributed throughout the world, such as one or more of storage systems 100B-100I.

FIG. 3—Network

Figure 3:
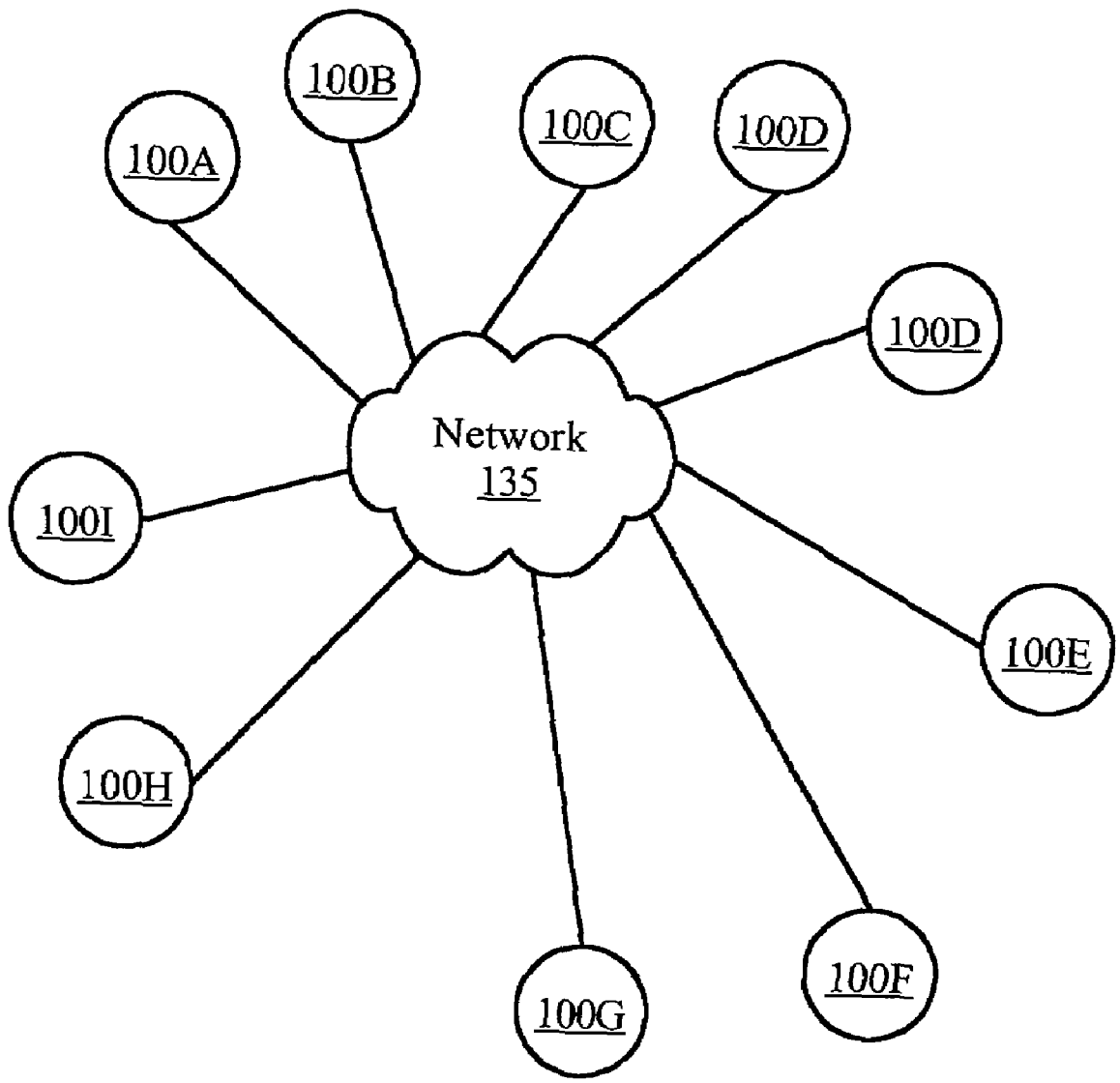
FIG. 3 is a block diagram of storage systems coupled to a network, according to various embodiments.

FIG. 3 is a block diagram of storage systems coupled to a network, according to various embodiments. In various embodiments, two or more storage systems 100A-100I may be coupled to a network 135.

Network 135 may couple a first storage system (e.g., storage system 100A) to a second storage system (e.g., storage system 100B). For example, network 135 may couple storage system 100A to one or more of storage systems 100B-100I. In some embodiments, network 135 may include the Internet or various portions of the Internet. Network 135 may include and/or be coupled to other types of communications networks, (e.g., other than the Internet) such as a public switched telephone network (PSTN), where storage systems 100 may send and receive information from/to the PSTN or other communication networks. Network 135 may include or be coupled to one or more wide area networks (WANs) and/or network 135 may be coupled to one or more local area networks (LANs). Network 135 thus may be, or be coupled to, any of various WANs, LANs, corporate networks, including the Internet. Network 135 may include a wired network, a wireless network or a combination of wired and wireless networks.

In some embodiments, storage systems 100A-100I may each have a network identification (ID). In various examples, a network ID may include one or more of an Internet protocol (IP) address, a logical name (e.g., a domain name service or DNS address), a media access control (MAC) ID, a WINS ID, and/or a SMB (server message block) ID, among others.

Figure 4A:
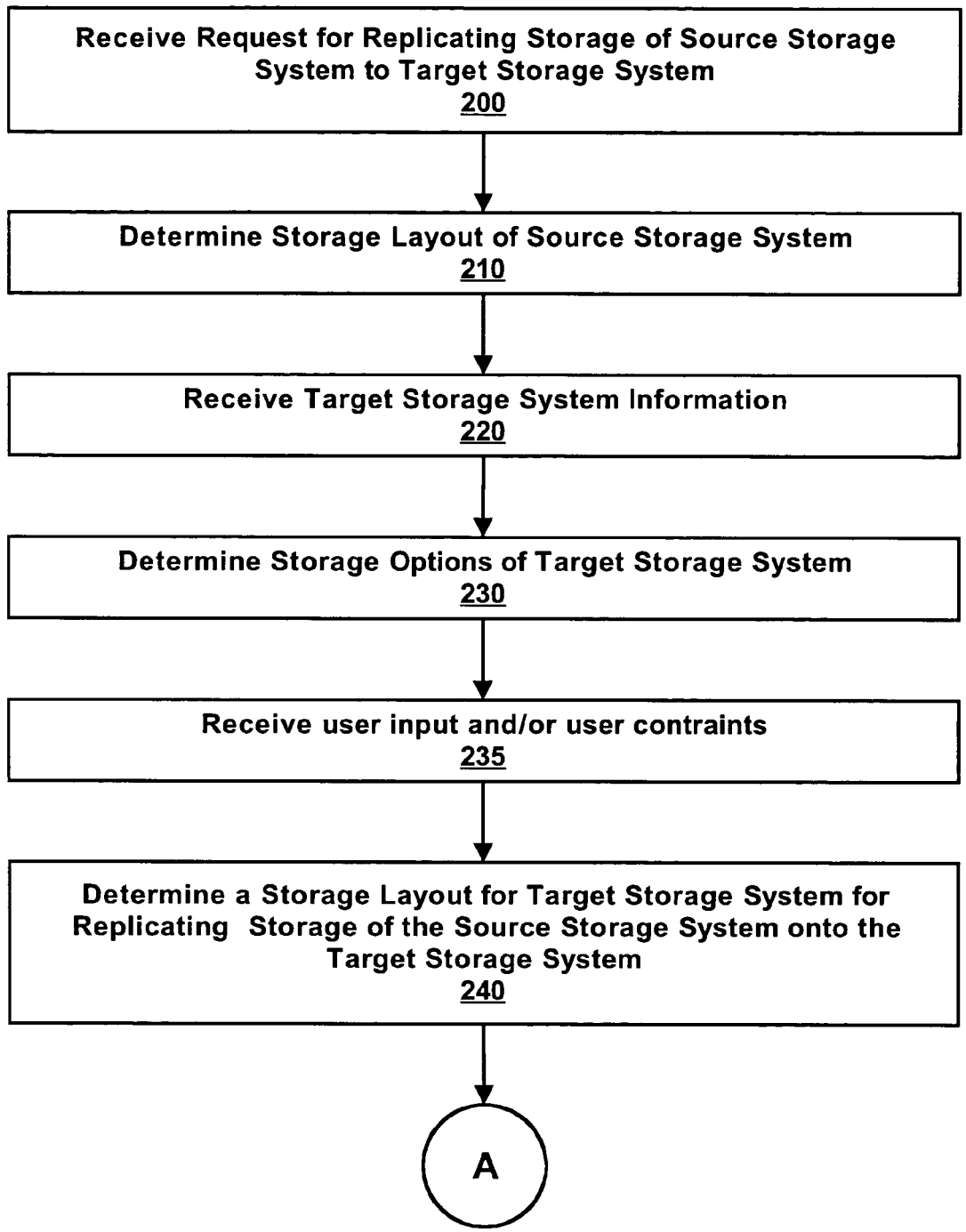
FIGS. 4A and 4B illustrate a flowchart of a method for replicating storage of a source storage system onto a target storage system, according to various embodiments.
Figure 4B:
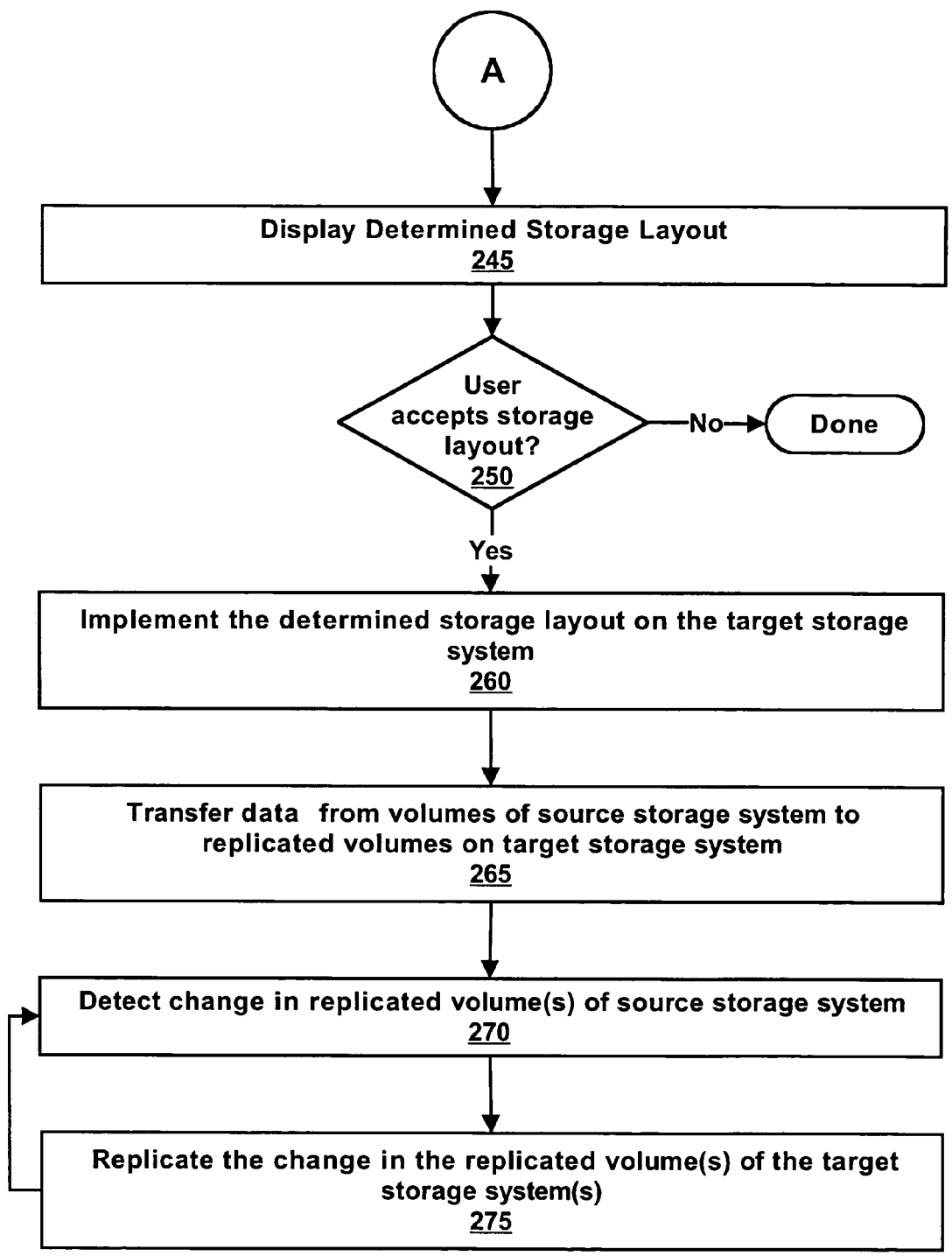

FIG. 4—Storage System Replication

FIG. 4 illustrates a method of replicating volumes of a first storage system to a second storage system, according to various embodiments. It is noted that in various embodiments one or more of the method elements may be performed concurrently, in a different order, or be omitted. Additional elements may be performed as desired. The method described in FIG. 4 is preferably performed by software executing on computer system 101A, computer system 101B, and/or another computer system (not shown).

As indicated at 200, a request may be received to replicate a storage layout of a source storage system (e.g., storage system 100A) to a target storage system (e.g., storage system 100B). The request may indicate one or more volumes of source storage system 100A to be replicated onto target storage system 100B. For example, the request may indicate that volumes 110A-110B of source storage system 100A are to be replicated onto target storage system 100B.

At 210, a storage layout of source storage system 100A may be determined. In various embodiments, determining the storage layout of source storage system 100A may include evaluating configuration information of source storage system 100A. For example, the method may evaluate a Layout.xml 234 (FIG. 6) and/or a Priority.xml 224 (FIG. 6), among other information, associated with source storage system 100A. For instance, it may be determined from Layout.xml 234 that source storage system 100A includes volumes 110A-110B, and volumes 110A and 110B are stored on storage device 105A and 105B, respectively. A size for each volume (e.g., volumes 110A-110B) to be replicated included in source storage system 100A may also be determined from Layout.xml 234.

At 220, information associated with target storage system 100B may be received. Source storage system 100A may be coupled to the target storage system 100B. Typically, source storage system 100A may be coupled to target storage system 100B through a network (e.g., network 135), and the information associated with target storage system 100B may include a network ID of target storage system 100B.

As indicated at 230, the method may automatically (i.e., programmatically) determine or detect existing storage capabilities of target storage system 100B. In some embodiments, 230 may be performed by Discoverer program 212 of FIG. 6. A flowchart diagram illustrating operation of Discoverer program 212 is provided in FIG. 8.

For example, it may be determined that target storage system 100B includes storage device 105C-105F. It may further be determined that storage devices 105C, 105D, and 105E may each comprise storage space 130C, 130D, and 130E, respectively and storage device 105F may comprise storage spaces 130F-130G. In various embodiments, software queries or obtains configuration information regarding target storage system 100B. For example, a VM (volume manager) Provider 172 (FIG. 5) may provide or include information regarding possibly available storage devices of target storage system 100B, and a VAIL Provider(s) 174 (FIG. 5) may determine various types of storage (e.g., single disks, hardware RAIDs, etc.) of storage devices 105C-105F of target storage system 100B.

At 235, the user (e.g., system administrator) may also choose to specify one or more constraints on the storage configuration or storage layout prior to determining the "optimal" storage configuration being determined in 240. It is noted that the term "optimal" used herein simply means "very good" according to some metric. These constraints may be received through an administrator GUI 152 (FIG. 5) and may be conveyed to a core logic engine 214 (FIG. 6). Core logic engine 214 may perform step 240 to determine the (preferably optimal) storage layout for target storage system 100B. In other words, in step 240, the optimal storage layout may be determined based on information described above (including the available amount of storage or free space, user input regarding target storage system 100B, and the priority.xml 224 document) and may also be determined based on the constraints specified by the user. Thus, the determined optimal storage layout produced in step 240 may be determined based on an accounting for the constraints identified by the user. This provides a mechanism for the user to specify constraints on priority and to have a storage layout automatically determined taking these constraints into account. For example, the method may receive a constraint from the user indicating that storage space 130G may not be used for volume replication; the method may receive a constraint from the user indicating that storage device 105D may not be used for volume replication; etc.

At 240, the method may automatically determine a storage configuration (or storage layout) for target storage system 100B. In some embodiments, automatically determining the storage configuration for target storage system 100B may be based on the existing storage capabilities of target storage system 100B and the information regarding source storage system 100A. In various embodiments, automatically determining the storage configuration for target storage system 100B may be based on the existing storage capabilities of target storage system 100B, the information regarding source storage system 100A, and user constraints (e.g., from step 235).

In the present application the term "automatically" refers to a function that is performed programmatically, i.e., the function is performed primarily by software executing on a computer system. Thus, the user is not manually required to determine the storage layout of target storage system 100B. In other words, in 240, the storage configurator program 178 may apply an allocation algorithm to automatically or programmatically determine the optimal storage layout for target storage system 100B based on this information. This greatly simplifies the operations required to be performed by a system administrator (e.g., a user).

In automatically determining the storage configuration of target storage system 100B, the method may examine a first data structure (called the "rule data structure" or Priority.xml 224) including rule information. The rule information may include rules about storage configuration principles of an application. In various embodiments, the rule information may include priority information that specifies a priority in application of the rules. For example, the rule information may include a structure or list of storage types in order of priority for one or more application data object types.

The method may automatically determine the storage configuration of target storage system 100B by examining available storage in target storage system 100B, determining storage allocations, and generating the storage configuration of target storage system 100B based on the storage allocations. In some embodiments, determining the storage allocations may be based on the available storage in target storage system 100B and the rule information, or determining the storage allocations may be based on user constraints, the available storage in target storage system 100B and the rule information.

The method may operate to determine the optimal storage configuration (or storage layout) based on the information regarding source storage system 100A determined at 210, the existing storage of target storage system 100B determined in 230, and the priority.xml 224 document referred to above. The method may operate to determine the optimal storage configuration (or storage layout) based further on the user constraints received in 235. In some embodiments, step 240 may be performed by core logic engine 214.

In various embodiments, the user may choose to specify some of the input provided to step 240 and repeat the above process to generate new optimal storage layouts based on this new information. For example, the user may re-invoke and/or re-use Administrator GUI 152 and provide new information associated with target storage system 100B in step 235, and then rerun step 240 to determine a new optimal storage layout based on the new information provided by the user in step 235. As another example, if the user adds more storage to target storage system 100B, the user may repeat the above method, whereby the optimal storage layout determined in step 240 may differ due to the fact that a greater or lesser amount of storage was added to and/or removed from the system which may be reflected in 230. As yet another example, the user may select a new priority.xml document, or modify an existing priority.xml document, and rerun step 240 to determine a new optimal storage layout based on this newer modified priority.xml document. In some embodiments, the storage configurator program 178 may be automatically re-invoked in response to certain events, such as the addition or removal of storage devices 105 from target storage system 100B.

As discussed above, the storage layout for the target storage system may be based on the storage layout of source storage system 100A and the storage options of target storage system 100B or further based on received user constraints. In determining the storage layout of target storage system 100B, various storage options of target storage system 100B may be combined and/or tested in various attempts to replicate various volume sizes and/or volume configurations of source storage system 100A. For example, storage spaces 130C-130G may be combined in various configurations to match one or more patterns of the layout of source storage system 100A. Programmatic determination of the storage layout for target storage system 100B is discussed in further detail below with regards to FIGS. 8-13.

At 245, the method may optionally operate to display the determined storage configuration to the user. The display may also include a graphical user interface element, such as a dialog box or other element where the user may graphically choose to accept or decline the determined optimal storage layout for target storage system 100B.

At 250, the method may determine if the user does accept the determined storage layout for target storage system 100B. If not, then operation of the method completes. In this case, the user may then repeat the method above or may choose to manually configure a storage layout for target storage system 100B. If the user accepts the optimal storage layout for target storage system 100B then, as indicated at 260, an implementer software 216 (FIG. 5) may operate to automatically or programmatically implement the layout on target storage system 100B.

In some embodiments, the method may simply store the determined storage configuration for target storage system 100B in a memory, possibly without displaying the determined storage configuration. In various embodiments, the method may automatically apply (e.g., implement) the determined storage configuration on target storage system 100B, again possibly without displaying the determined storage configuration for target storage system 100B and/or without receiving any acceptance from the user.

After the one or more replicated volumes on target storage systems 100 are implemented on to storage system 100B, then at 265 data from one or more volumes for replication of storage system 100A may be transferred to the one or more replicated volumes on target storage systems 100B. For example, after volumes 105A-105B of storage system 100A have been replicated to storage system 100B and implemented as volumes 110C-110D of target storage system 100B, then data from volumes 105A and 105B of source storage system 100A may be transferred to volumes 110C and 110D of target storage system 100B, respectively.

At 270, a change in the one or more volumes for replication of source storage system 100A may be detected. For example, the change may be associated with a data modification operation (e.g., write, remove, create, rename, etc.). At 275, the change may be replicated to the one or more replicated volumes on the one or more target storage systems 100B. In other words, if a change in the one or more volumes for replication of source storage system 100A, the change is replicated or made to the one or more volumes replicated on target storage system 100B. The method may proceed to 270, and data may be continually replicated from source storage system 100A to target storage system 100B.

Modification of Optimal Storage Layout

The determined storage layout displayed in step 245 may be displayed in any of various ways. The optimal storage layout may be displayed as a tree structure. The optimal storage layout may be shown iconically in a diagram. For example, a storage configuration diagram may be displayed which includes icons for each of the storage units, e.g., storage systems, drives, storage devices 105, storage spaces 130, drive arrays, SANs, etc., and the determined storage layout may be graphically and/or iconically depicted in this storage configuration diagram. Regardless of the manner in which the determined storage layout is displayed to the user, in various embodiments, the user may graphically manipulate the displayed storage layout to make modifications to the storage layout. Thus, if the optimal storage layout is displayed as a tree structure in step 245, the user may optionally provide the ability to manually adjust different aspects of the tree structure or different values associated with the tree structure to change the storage layout for target storage system 100B. For example, the user may make changes and then hit "apply" to apply these changes. If the optimal storage layout is displayed graphically or iconically, the user may use various drag and drop techniques, cut-and-paste techniques, and/or check-box techniques, among other graphical editing techniques to change the optimal storage layout for target storage system 100B as desired. In some embodiments, the optimal storage layout for target storage system 100B determined by the storage configurator 178 is not modifiable by the user.

Figure 5:
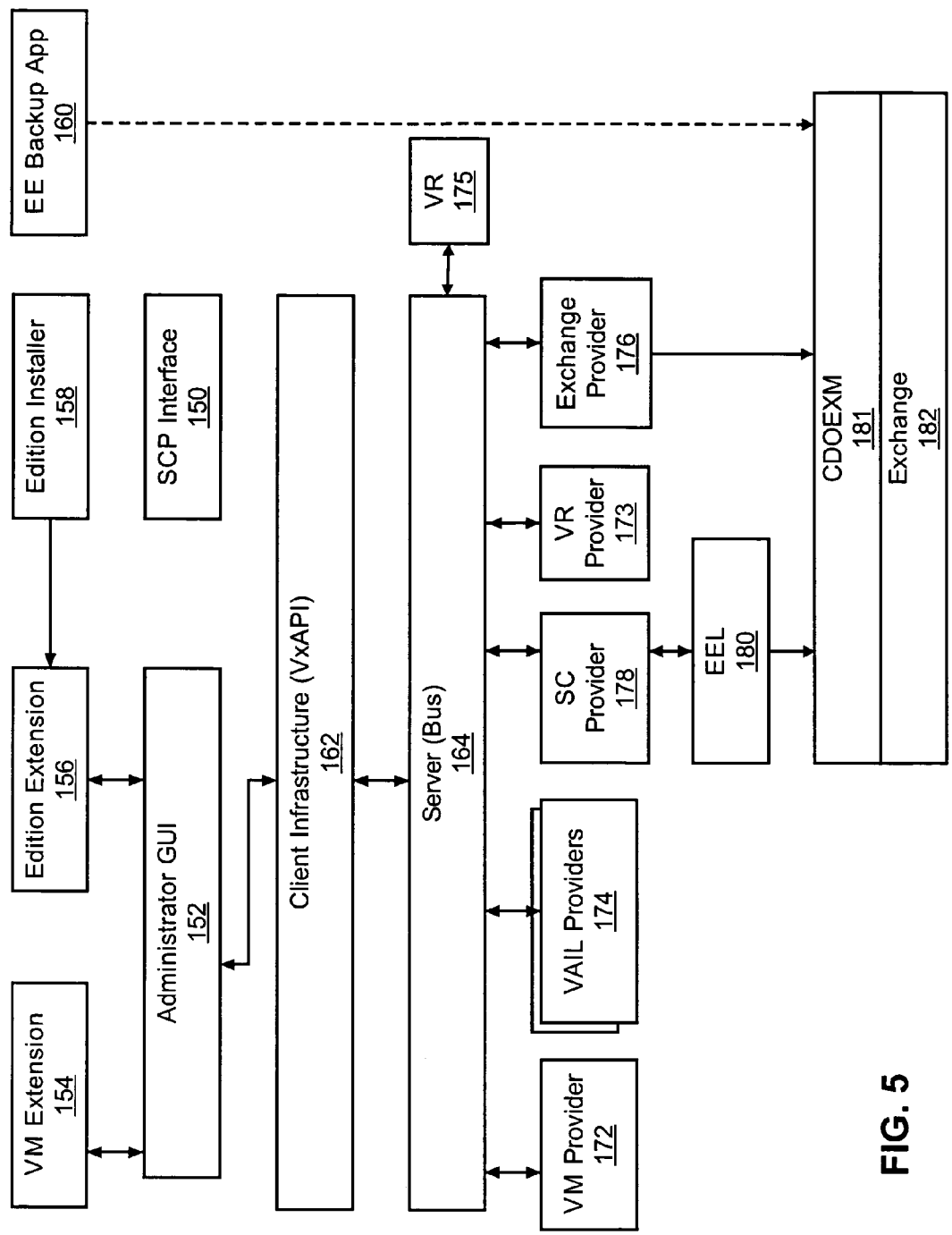
FIG. 5 illustrates a software architecture of exemplary configuration software, according to various embodiments.
Figure 6:
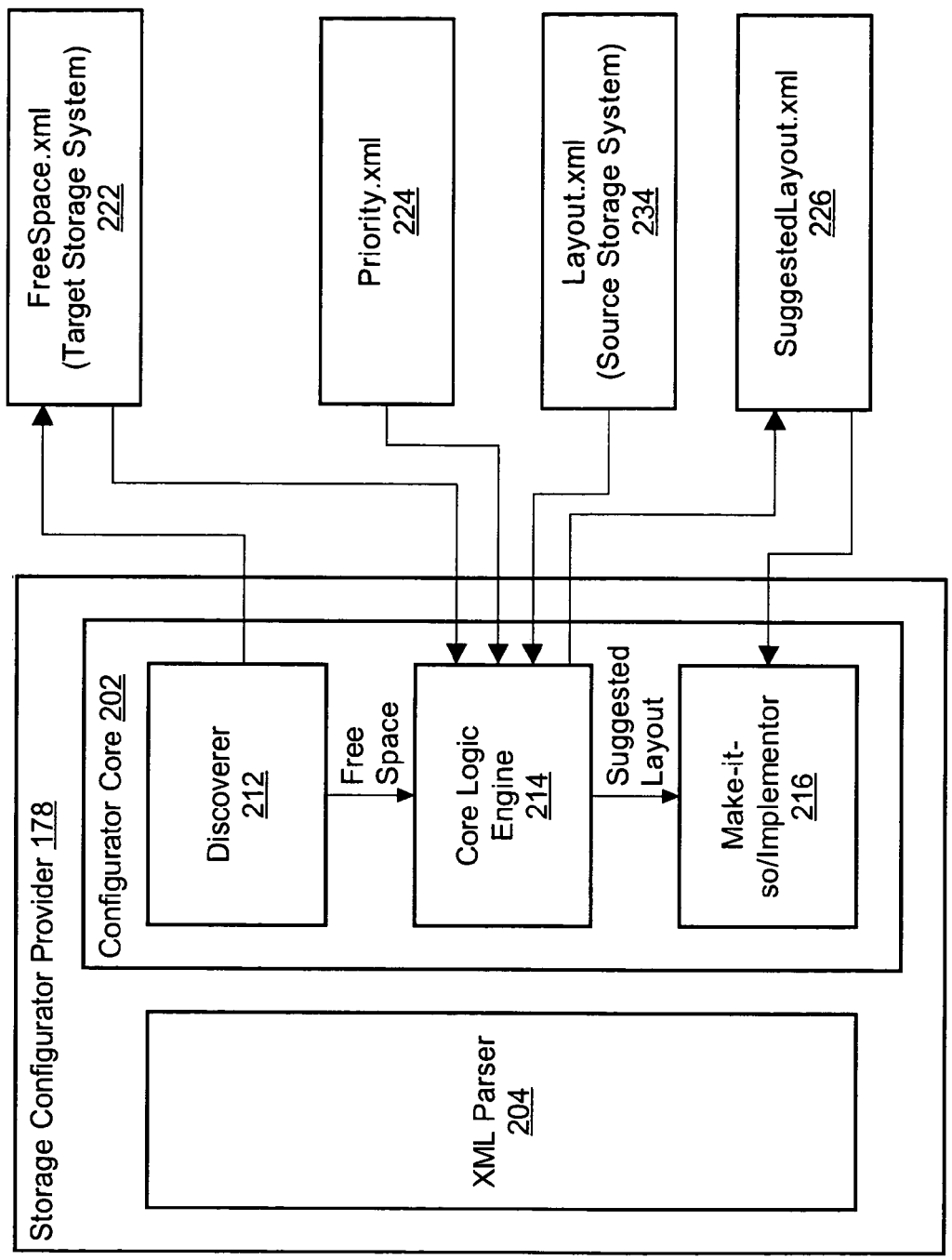
FIG. 6 illustrates a software architecture of the Storage Configurator software, according to various embodiments.

FIG. 5—Configuration Software Architecture

FIG. 5 illustrates a software architecture of exemplary configuration software, according to various embodiments. The configuration software may execute on computer system 101A, computer system 101B, and/or another computer system (not shown) and may be used by a system administrator (e.g., a user). The configuration software may provide a management console to the system administrator for performing various configuration and/or management functions, including performing the method described in FIGS. 4A-4B. In various embodiments, the configuration software shown in FIG. 5 may include one or more software programs (referred to collectively as the "Storage Configuration" program) for automatically determining storage configurations or storage layouts for storage systems 100. The configuration software shown in FIG. 5 may also include software for automatically applying a determined storage configuration to one or more storage systems 100. It is noted that in various embodiments one or more of the software programs may execute concurrently, at various times, or be omitted. Additional software programs may be executed as desired.

As shown, the software architecture in FIG. 5 may include an Administrator GUI or console 152. The Administrator GUI 152 may support various extensions, such as a VM (Volume Manager) Extension 154 and an Edition Extension 156. The VM Extension 154 may provide a console for volume management for non-volatile storage, e.g., storage devices 105. The Edition Extension 156 may provide the user interface for various Edition functionality, such as the Storage Configurator. An Edition Installer 158 may be provided for installing the Edition Extension 156. An Edition Extension (EE) Backup application 160 may also be provided for backing up application data. A SCP Interface 150 may also be provided for providing external access to a Storage Configurator (SC) Provider 178.

The Administrator GUI 152 may interface to a Client Infrastructure layer 162. The Client Infrastructure layer 162 may in turn interface to a Server (Bus) program layer 164. The Server (Bus) program layer 164 may abstract various communication functions among various distributed software programs executing in a network system (e.g., including network 135). As shown, the Server (Bus) program layer 164 may interface to various programs, such as VM (Volume Manager) Provider 172, VR (Volume Replicator) Provider 173, VAIL (Veritas Array Integration Layer) Providers 174, VR (Volume Replicator) 175, and an Exchange Provider 176. The VM provider 172 may provide volume management for non-volatile storage, e.g., disk drives. The VR Provider 173 may provide information associated with existing replicated volumes and/or direct the VR 175. The VAIL Providers 174 provide management services for RAID arrays. The VR 175 (e.g., Veritas Volume Replicator) may provide volume replication between at least two storage systems (e.g., storage system 100A and storage system 100B).

Administrator GUI 152 may also interface to a first program, which may be referred to as SC (Storage Configurator) Provider 178. SC Provider 178 may include at least a portion of the Storage Configuration software of various embodiments.

FIG. 6—Storage Configurator Software Architecture

FIG. 6 illustrates a software architecture of the Storage Configurator software, according to various embodiments. The Storage Configurator software may include a Storage Configurator Provider 178 and various other programs and/or files. Storage Configurator provider 178 may include a Configurator Core 202 and an XML parser 204 which may perform various XML parsing functions. Configurator Core 202 may perform various operations to obtain the information used in determining an optimal storage layout.

The Storage Configurator software may also include a FreeSpace.xml file 222, a Priority.xml file 224, and a Layout.xml file 234. The FreeSpace.xml file 222 may include information about available free space in a target storage system (e.g., one of storage systems 100B-100I). The FreeSpace.xml file 222 may be created by a Discoverer component 212, as discussed below.

Figure 7:
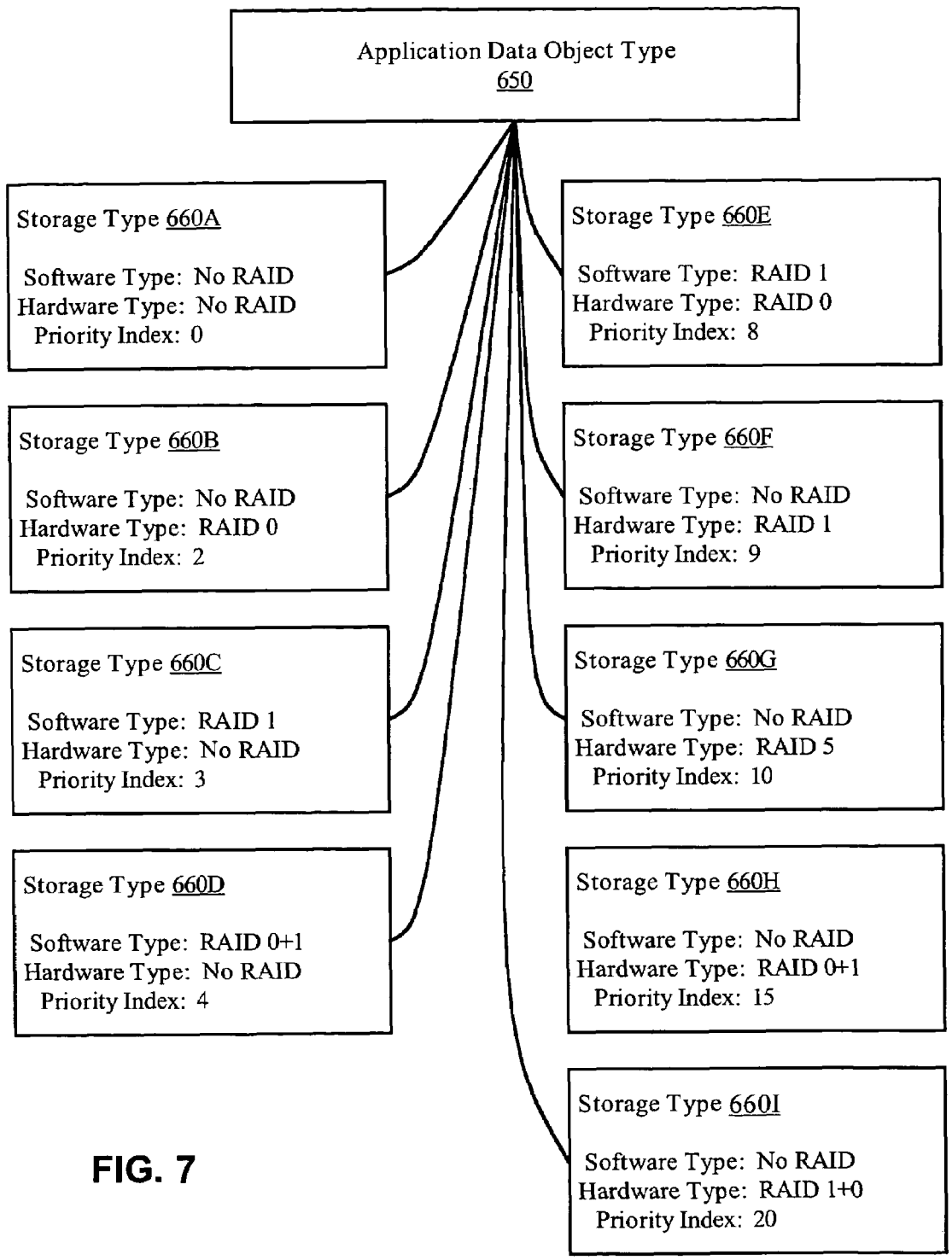
FIG. 7 is an exemplary block diagram that illustrates an application data object type and storage types which may be included in a rules data structure, according to various embodiments.

In some embodiments, Priority.xml file 224 may also be referred to as a "rule information" data structure or "rule data structure". Priority.xml file 224 may include rule information used in determining a storage configuration or layout. The rule information may include rules about storage configuration principles of one or more application data objects. The rule information may also include priority information, wherein the priority information specifies a priority in application of rules in the rule information. The rule information may include storage types in order of priority for different application data types. Priority.xml file 224 (or rule information data structure) may specify relative preferences for each type of storage to each type of application data object type (e.g., database, transaction log, etc.) or volume. Further details of relative preferences for each type of storage to each data object type are illustrated in FIG. 7. The priority.xml document may thus include the priority or rule information for layout determination. In some embodiments, Priority.xml file 224 is not modifiable by the user. In various embodiments, Priority.xml file 224 is modifiable by the user. In some embodiments, a plurality of Priority.xml files 224 are maintained, and the user may select a preferred Priority.xml file 224. The type of application data objects for which volume replication is being determined may specify one of (or a subset of) the plurality of Priority.xml files 224.

An exemplary rule data structure (priority.xml file) is listed below:
  Each Storage Group results in its own Disk Group
  Each class of user results in its own Database
  Transaction Logs kept on separate set of storage device(s)
  All STM files within Storage Group can be grouped together
  All EDB files within Storage Group can be grouped together
  Last resort: Put STM and EDB files from same Storage Group together
  Suggested STM file size=# users*mailbox size
  Suggested EDB file size=# users*mailbox size
  Additional rules about hot spares, RAID-5 logging, FMR logs, etc.

The user of the Storage Configurator Provider 178 may provide input about target storage system 100B, and the volume replication software may include a graphical user interface (GUI) or wizard that guides the user in entering this input.

Configurator Core 202 may include a Discoverer 212, a Core Logic Engine 214, and an Implementer 216. Discoverer 212 may operate to automatically (i.e., programmatically) detect existing storage in a target storage system 100B (e.g., storage system 100B). Discoverer 212 may generate FreeSpace.xml file 222, described above. FreeSpace.xml document 222 may describe free space or available storage space in target storage system 100B. For example, FreeSpace.xml document 222 may include information which indicates that storage spaces 130C-130G may be used to create one or more volumes in storage system 100B.

FreeSpace.xml document 222 may be available to or accessible by the Core Logic Engine 214. Core Logic Engine 214 may receive the free space information from FreeSpace.xml 222. As noted above, the Storage Configurator software may also include or access a priority document referred to as Priority.xml 224. The optimization algorithm(s) in the Core Logic Engine 214 may analyze the priority or rule information in Priority.xml 224 in determining how to optimize usage of the discovered free space or available storage space in target storage system 100B.

Core Logic Engine 214 may analyze the available free space in the FreeSpace.xml document 222; may analyze the user input, application data object specific information, and/or volume information included in the Layout.xml document 234; and may examine the priority or rules contained in the Priority.xml document 224. Core Logic Engine 214 may operate to generate a suggested layout or suggested storage configuration for existing storage of target storage system 100B. The suggested layout is embodied in a document called SuggestedLayoutFile.xml 226. In various embodiments, Core Logic Engine 214 preferably forms the core of the storage configurator. In some embodiments, the Core Logic Engine 214 may utilize a policy whereby the volume size equal to or greater than the volume size of the volume to be replicated.

Implementer 216 may receive the SuggestedLayoutFile.xml 226 and may operate to implement the suggested layout. In other words, Implementer 216 may analyze the information in SuggestedLayout.xml 226 and may configure the various resources (including non-volatile memory and/or storage devices 105) of target storage system 100B according to the layout information, optionally in response to user input and/or approval of the suggested layout.

Therefore, in determining a (preferably optimal) storage configuration according to various embodiments, Core Logic Engine 214 may utilize user input received from the user, such as through a console wizard or GUI; application specific information contained in the Application Specific Layer 180; the amount of available storage or free space (or memory, e.g., non-volatile memory, storage spaces 130, storage devices 105, and/or RAM) present in target storage system 100B; and the Priority.xml file 224.

Various of the programs in the storage configurator software may be stored in the same computer system, or on different computer systems coupled via a network (e.g., network 135), such as in a client server model. For example, in some embodiments, Storage Configurator Provider 178 is stored and may execute on a first computer system (e.g., computer system 101A), and the Application Specific Layer 180 may be stored on a second computer system (e.g., computer system 101B) that is coupled to the first computer system over a network (e.g., network 135). The Storage Configurator Provider 178 may be operable to access information and/or instructions from the Application Specific Layer 180 over the network. In a similar manner, various of the other files, such as the Priority.xml file 224, the FreeSpace.xml document 222, and others may be distributed among various computer systems, as desired.

Therefore, various embodiments provide a generalized storage configuration architecture that may allow a storage configuration engine to suggest and/or implement optimal storage layouts for diverse volume replications. The software architecture may operate to cleanly abstract the volume replication specific tasks from the core methods and algorithms that determine and implement a suggested layout. Thus details about the volume for which storage is being configured may be abstracted from the core logic engine that actually may determine an optimal storage layout. Thus the storage configuration technology may be quickly applied to diverse volume replications without changing any code (or possibly changing minimal code or parameters only) in the core logic engine.

FIG. 7—Storage Types

FIG. 7 is an exemplary block diagram that illustrates an application data object type and storage types which may be included in priority.xml 224, according to various embodiments.

In various embodiments, priority.xml 224 may include various hierarchies. For example, priority.xml 224 may include a data structure which may be associated with a hierarchical tree data structure. Priority.xml 224 may include application data object type 650. In various examples, an application data object type 650 may include or may be a database, an index for a database, and/or a transaction log, among others.

Furthermore, application data object type 650 may have various "children" (e.g., one or more data types or data structures associated with application data object type 650). For example, application data object type 650 have storage types 660A-660I as children data structures, and each storage type 660 may include information indicating a software RAID level, a hardware RAID level, and/or a priority index (e.g., a relative preference), among others. In various embodiments, the information indicating the software RAID level, the hardware RAID level, and/or the priority index may each be included in separate data structures as children data structures of application data object type 650.

Figure 8:
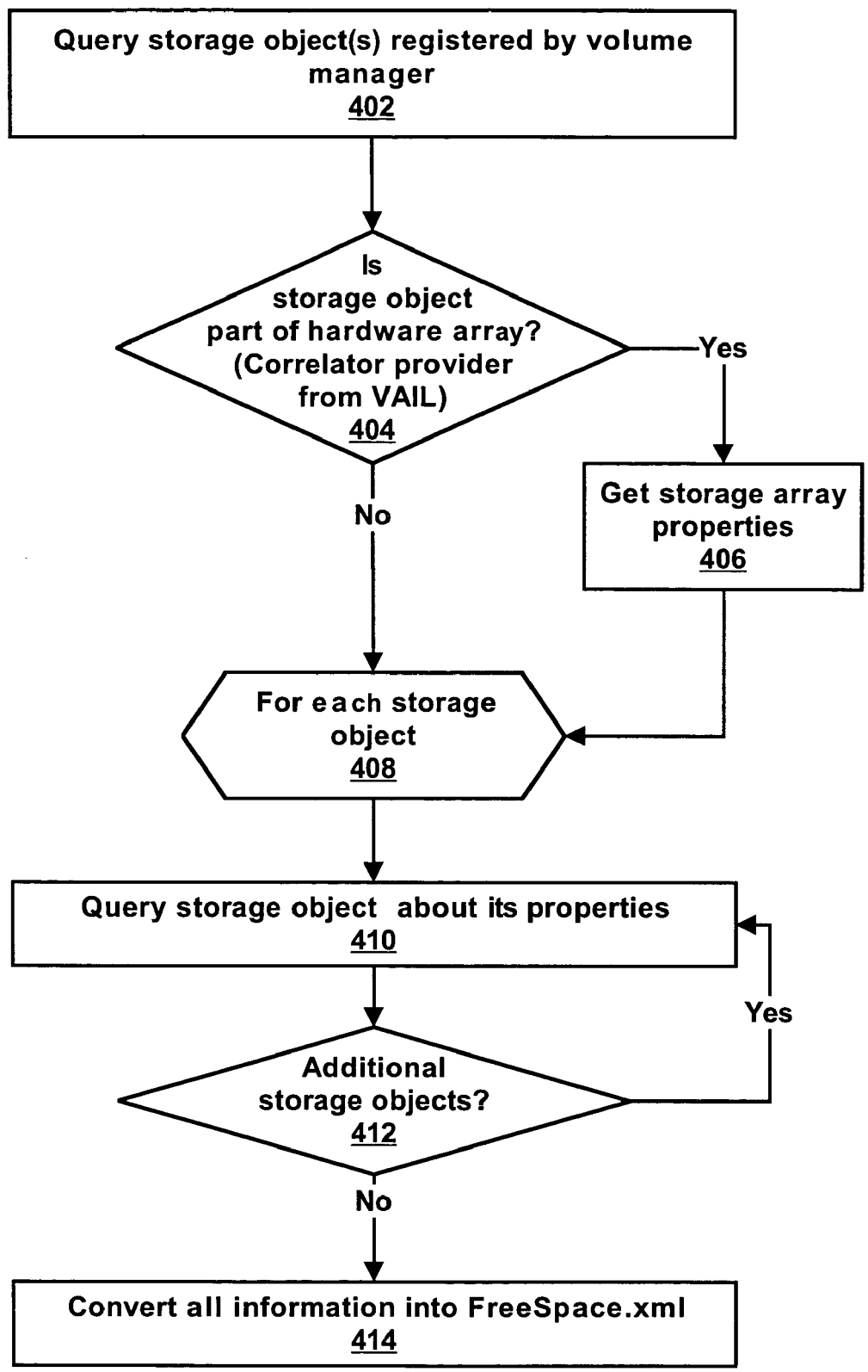
FIG. 8 is a flowchart diagram illustrating automatically detecting existing storage in the system, according to various embodiments.

FIG. 8—Discoverer Operation

FIG. 8 is a flowchart diagram illustrating operation of the discoverer component 212, according to various embodiments. It is noted that in various embodiments one or more of the method elements may be performed concurrently, in a different order, or be omitted. Additional elements may be performed as desired. In various embodiments, the flowchart diagram of FIG. 8 may illustrate operation of step 230 of FIG. 4.

As indicated at 402, the method may query storage devices 105 registered by a volume manager. This may operate to determine what storage devices 105 are available to target storage system 100B. One or more storage devices 105 may be presently included in target storage system 100B and/or one or more storage devices 105 may be available through a network (e.g., network 135), such as a SAN (Storage Area Network). For example, storage devices 105C-105F may be available to target storage system 100B (e.g., storage system 100B). For instance, storage devices 105C-105E may be presently included in target storage system 100B, and storage device 105F may be a SAN which is available through a network. Storage devices available to target storage system 100B may be considered included in target storage system 100B.

At 404 the method determines if each storage device 105 determined in 402 is part of a hardware array. This operation may be performed by VAIL Provider 174. If a storage device 105 is determined to be part of a hardware array in step 404, then in 406 the method may obtain respective hardware array properties of storage device 105, and operation may advance to 408. If a respective storage device 105 is determined to not be part of a hardware array, then operation may proceed to 408.

As indicated at 410 and 412, the method queries each of storage devices 105 about its properties. The property information for storage devices 105 may be converted into a FreeSpace.xml document 222, at 414. The FreeSpace.xml document may include information about free space in target storage system 100B, preferably all free space available for volume replication available to target storage system 100B.

Figure 9:
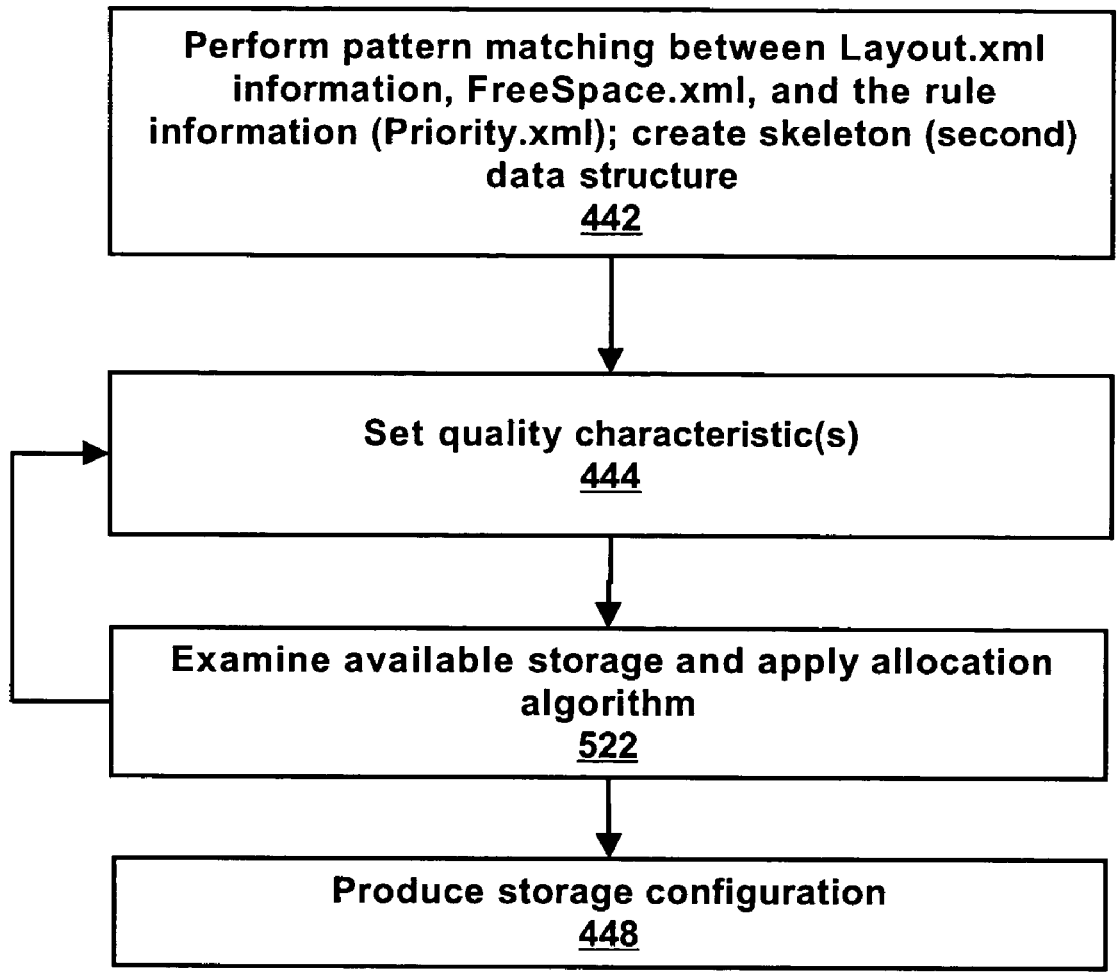
FIG. 9 is a flowchart diagram illustrating automatically determining a storage configuration, according to various embodiments.

FIG. 9—Automatically Determining a Storage Configuration

FIG. 9 is a flowchart diagram illustrating automatically determining a storage configuration, according to various embodiments. FIG. 9 provides more detail regarding step 240 of FIG. 4. It is noted that in various embodiments one or more of the method elements may be performed concurrently, in a different order, or be omitted. Additional elements may be performed as desired.

In 442 the method may first perform pattern matching between the layout information (e.g., Layout.xml 234) of source storage system 100A, the rule information (e.g., Priority.xml 224), and available storage information (e.g., FreeSpace.xml 222) of target storage system 100B. The method may then create a second data structure (also called the "skeleton" data structure and the "NewTree" data structure) comprising storage organization information of the storage configuration for target storage system 100B based on the results of the pattern matching. The second data structure may comprise information regarding which application data objects should be included in which replicated volumes. The second data structure may be an intermediate form of the SuggestedLayout data structure (e.g., SuggestedLayout.xml 226) including storage organization information of target storage system 100B. In some embodiments, each of the rule information data structure (priority.xml) 224 and the layout information of source storage system 100A (e.g., Layout.xml document 234) may comprise text files. The method may perform pattern matching or textual analysis between these two text files to determine a matching or correspondence between data in each of the two text files.

In 444 the method may set one or more volume quality characteristics. The method may use various quality characteristics for volumes (e.g., fault tolerant and not including one or more storage devices which include a storage space that is already included in a volume, fault tolerant and may include one or more storage devices which include a storage space that is already included in a volume, and/or possibly non-fault tolerant, among others) in 444, and then in 522 the method may examine the available storage devices 105 and/or storage spaces 130 and apply an allocation algorithm based on the volume quality characteristic(s).

Steps 444 and 522 may be performed two or more times in a repetitive and/or iterative fashion, as shown. In other words, the method may set a first volume quality characteristic(s) and apply the allocation algorithm to this first volume quality characteristic(s), and then determine a second volume quality characteristic(s) and apply the allocation algorithm, and so on, until an optimal (or an acceptable) storage configuration is produced. Steps 444 and 522 are described further with respect to steps 504-508 and 522A-522C of FIG. 10, according to various embodiments. The allocation algorithm may include a "top down" and/or a "bottom up" greedy (or pseudo-greedy) algorithm with backtracking, and the results of these steps may produce a storage configuration for target storage system 100B. Thus, in some embodiments, the storage configuration may be automatically determined using at least a subset of the above information, e.g., two or more of the first data structure (rule data structure) and the second or skeleton data structure.

In some embodiments, after the storage configuration has been determined or generated, in 448 the storage configuration may be stored in a memory. The storage configuration may be useable in configuring target storage system 100B. In various embodiments, the method may then operate to configure target storage system 100B according to the storage configuration.

Figure 10:
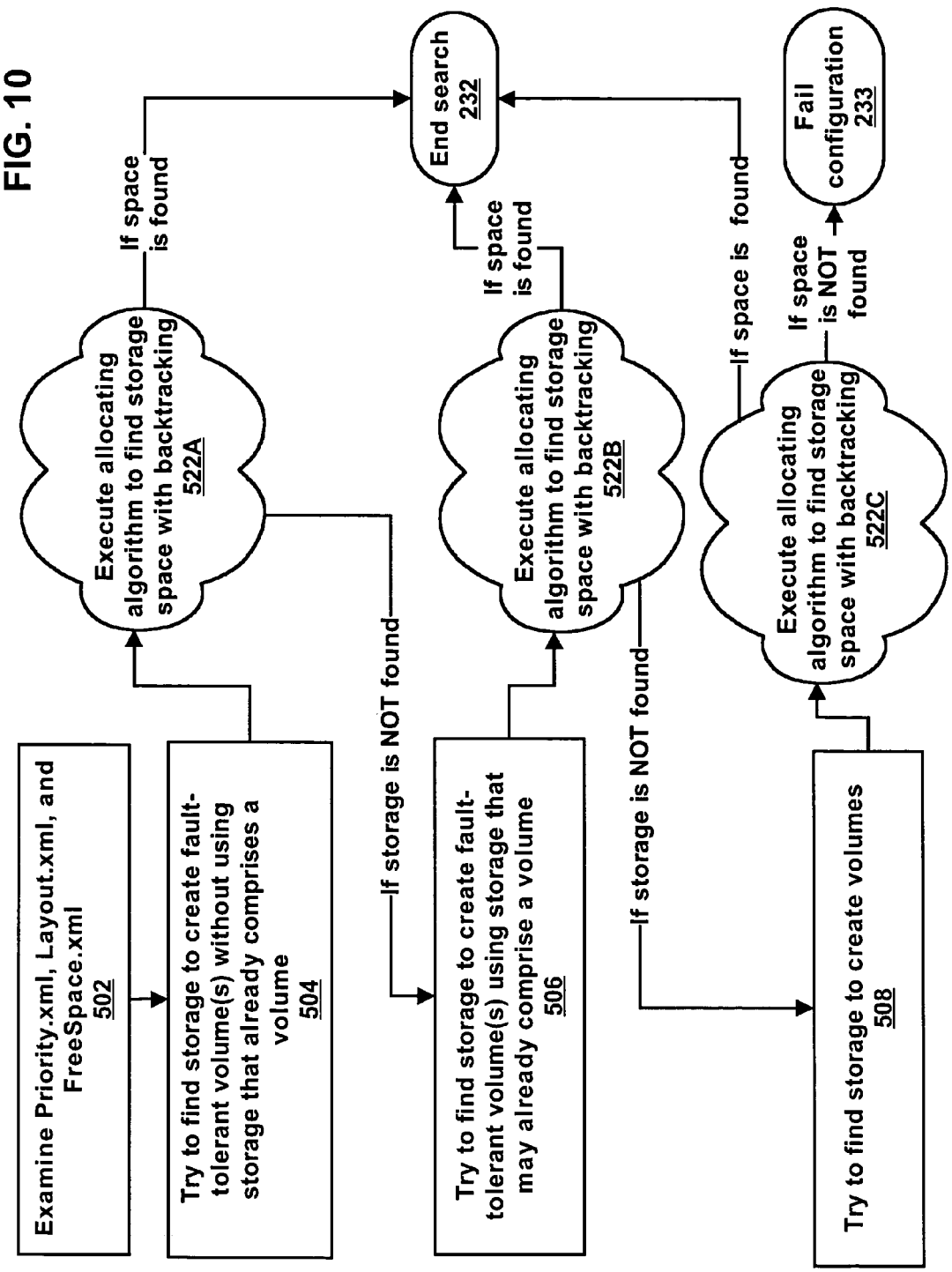
FIG. 10 is a flowchart diagram illustrating various functionality of a core logic engine, according to various embodiments.

FIG. 10—Core Logic Engine

FIG. 10 is a flowchart diagram illustrating various functionality of core logic engine 214, according to various embodiments. It is noted that in various embodiments one or more of the method elements may be performed concurrently, in a different order, or be omitted. Additional elements may be performed as desired. In FIG. 10, step 502 corresponds to step 442 of FIG. 9, steps 504-508 correspond to step 444 of FIG. 9, and steps 522A-522C correspond to step 522 of FIG. 9.

In step 502 the method may examine information of available storage space (e.g., FreeSpace.xml 222) of target storage system 100B (e.g., storage system 100B) and the layout (e.g., Layout.xml 234) of the source storage system 100A (e.g., storage system 100A). In step 502 the method may examine this information and perform pattern matching or text string matching in order to create a data structure or skeleton of the constraints for a layout of target system 100 to be created (the second data structure). In response to these matches, the method then creates a second data structure, also referred to as a skeleton data structure, with the beginning organization of the storage configuration or layout (e.g., SuggestedLayout.xml 226).

In steps 504-508 and 522A-522C, the method may determine which may comprise one or more storage spaces 130 of target storage system 100B and may attempt to allocate one or more storage spaces 130 (e.g., storage spaces 130C-130G) to one or more volumes to create the storage configuration for target storage system 100B. The allocation algorithm performed in 522 (522A-522C) may be a "greedy" algorithm with back tracking, although other allocation algorithms may be performed. The allocation algorithm may be a top down algorithm or a bottom up algorithm, or a combination thereof. Any of various types of allocation algorithms may be used, as desired.

As shown in step 504, the method may use the freespace.xml information (e.g., FreeSpace.xml 222) to attempt to find one or more storage devices 105 (e.g., 105C-105F) which may be used to implement one or more fault tolerant volumes that may not include a storage space 130 which is already included in a volume. For example, storage space 130G may be included in a volume while storage spaces 130C-130E may not already be included in a volume, thus storage devices 105C-105E do not include one or more storage spaces already included in a volume. Further, one or more storage spaces 130C-130E may be included in a fault tolerant storage device 105, such as a hardware RAID (redundant array of independent drives) device configured with "level 0+1" (e.g., RAID 0+1) or "level 5" (e.g., RAID 5), among others. Storage spaces 130F-130G may be included in a non-fault tolerant storage device 105F. Various examples of non-fault tolerant storage devices include single drives and/or JBOD devices.

In some embodiments, various non-fault tolerant devices 105 may be combined with other non-fault tolerant devices 105 and/or fault tolerant devices to form (e.g., implement) a fault tolerant volume. For example, the fault tolerant volume may be formed by two or more storage devices with software executable to perform various functionalities of various RAID levels (e.g., fault tolerant configurations of storage devices) which thereby, creates a "software" RAID.

In performing step 504, the method performs an allocation algorithm in step 522 (referred to here as 522A) to attempt to find storage space for the layout of target storage system 100B. If the algorithm, in step 522A, locates storage space sufficient for each volume to be replicated, then the search completes as indicated at 232.

If storage space is not found in 522A, then in step 506 the method attempts to find one or more storage devices 105 which may be used to implement one or more fault tolerant volumes that may include a storage space 130 which is already included in a volume. For example, storage device 105F may be available to target storage system 100B, and storage device 105F may include storage space 130G which may be included in a volume while storage space 130F (included in storage device 105F) may be available to be included in a replicated volume. Storage device 105F may be a SAN (storage area network) and include storage spaces 130F-130G. Storage device 105F may be a fault tolerant storage device (e.g., a RAID configured with "level 5" or RAID 5). Thus, storage device 105F may provide fault tolerant storage space (e.g., storage space 130F) and have storage space included in a volume (e.g., storage space 130G). Again, in performing 506, the method may perform the allocation algorithm of 522 (referred to here as 522B). If space is found, then the search may complete as indicated at 232.

If space is not found in step 522B, then operation advances to step 508. In step 508, the method may attempt to locate one or more storage devices 105 that may be used to implement one or more replicated volumes which may not be fault tolerant. Again, the algorithm of 522 (referred to here as 522C) may be performed. If space is found, then the search may complete as indicated at 232. If no layouts, including non-fault tolerant layouts, are able to be determined in step 522C, then the configuration may fail as indicated at 233.

In various alternate embodiments, the methodology described in FIG. 10 is reversed, and a "bottom up" algorithm is used. In other words, all layouts that may include non-fault tolerant layouts are first examined to determine possible layouts, then operation proceeds to progressively improve storage layouts through step 506, then performs step 504. If one of the operations fails to produce a valid result, then further operations may need not be performed. In other words, if it is not possible to find a volume layout that may be non-fault tolerant in step 508, then there may be no point in performing either steps 506 or 504, since these solutions require even a greater (e.g., more "expensive") volume layout(s) (or more complex storage devices and/or configurations) than step 508.

In some embodiments, the allocation algorithm may use a combination of bottom up and top down approaches. For example, the method may begin the analysis from a "most expensive" to "least expensive" grouping of storage spaces 130, e.g., 130C-130G (as shown in steps 504-508). For each determined volume (in one of steps 504-508), the method may perform the allocation algorithm by starting with the lowest priority and "least expensive" volume option (e.g., lowest priority index) in priority.xml 224 file and/or Layout.xml 222 and then working upward. As noted above, the allocation algorithm is performed to actually allocate volumes based on storage space(s) 130. Thus the method may proceed through volume types in a top down manner, and the allocation algorithm may proceed in a bottom up manner. After the method has found one or more storage spaces 130 for a volume, then an improvement pass may be performed, as described further below.

The following describes one embodiment of a portion of the storage configuration creation process (i.e., steps 504-508 and 522A-522C):

1. Obtain an initial grouping of storage spaces 130 of target storage system 100B, e.g. how storage space(s) 130 may be grouped on to form one or more replicated volumes. Specifically, the first pass generally attempts to keep each volume on its own storage device 105 to help optimize performance.
2. The allocation algorithm attempts to "create" and then map suggested storage spaces 130 of target storage system 100B to replicated volumes. "Create" in this sense does not mean to actually create the physical volume. Instead, the term "create" in this context means to reserve space from the "freeSpace.xml" data structure for the chosen volume.
   a. In the first pass, the storage configurator may choose the least expensive (least resource intensive) volume type available that is still fault tolerant which may often be a simple concatenated volume over hardware RAID, or a simple software mirror over a two or more non-fault tolerant storage devices 105.
   b. The allocation algorithm attempts to create and assign a storage space 130 of target storage system 100B to each volume to be replicated:
      i. If the allocation algorithm runs out of space (e.g., all the available elements in freeSpace have been marked as reserved and there are still volumes that need storage space), the allocation algorithm returns to step 1 and obtains a different, less expensive, quality characteristic. The very last time, the allocation algorithm will allow the creation of non-fault tolerant volumes as well.
      ii. If the allocation algorithm succeeds in finding an inexpensive volume configuration for every volume to be replicated, the allocation algorithm performs an "improvement pass". This pass goes through one storage volume at a time, releases all the reserved storage space(s) for that volume from FreeSpace, and then it tries to create a volume suggestion starting with the most expensive volume types, and working its way to the least expensive. This way, the allocation algorithm will produce at least as good of a layout as the starting layout, but the layout has a good likelihood of being improved.

Figure 11:
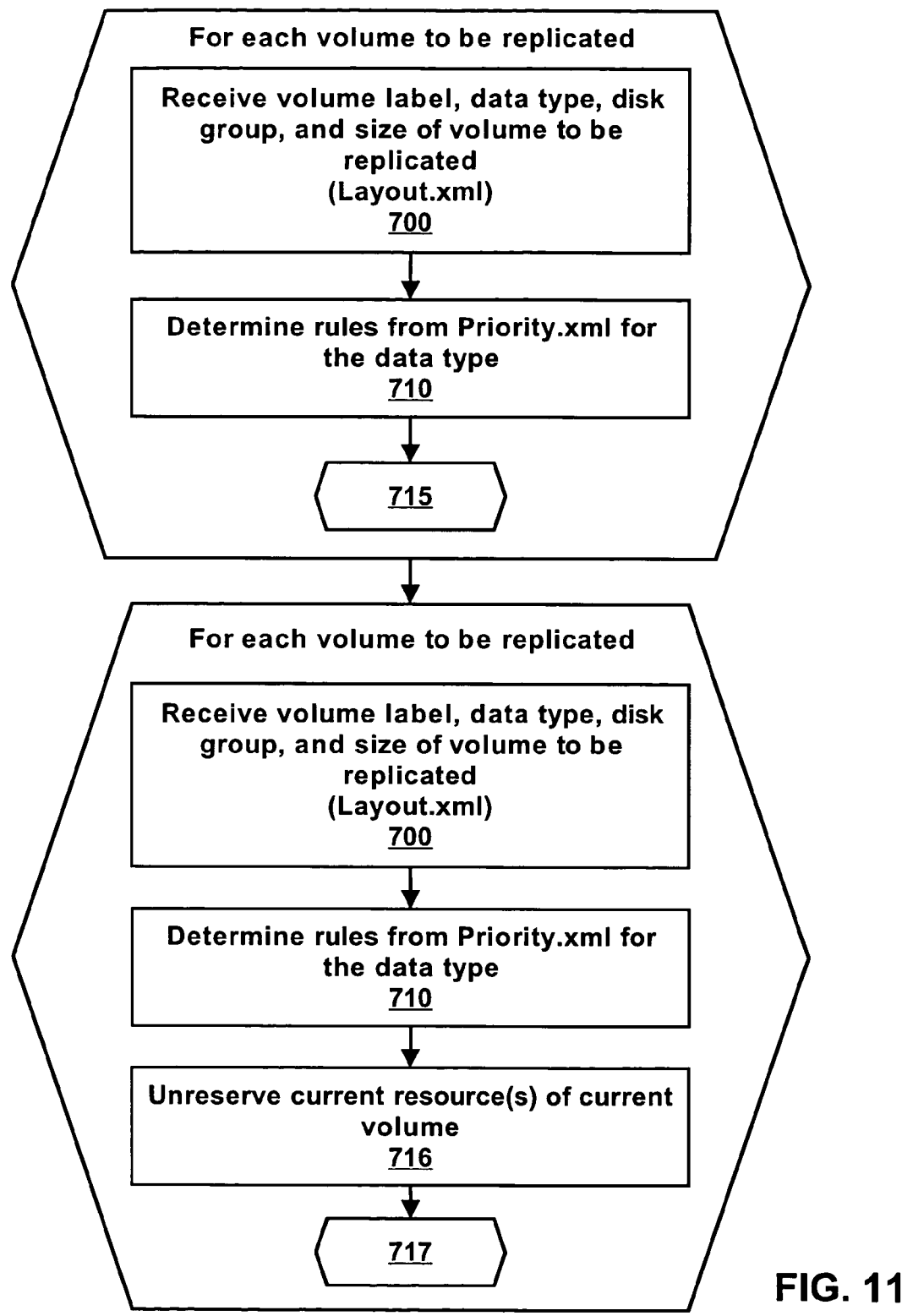
FIG. 11 illustrates a flowchart for allocating storage, according to various embodiments.

FIG. 11—Method for Allocating Storage

FIG. 11 illustrates a flowchart for allocating storage which provides more details of step 522 of FIGS. 9 and 10, according to various embodiments. It is noted that in various embodiments one or more of the method elements may be performed concurrently, in a different order, or be omitted. Additional elements may be performed as desired.

In various embodiments, step 522 may be performed for each volume to be replicated. As indicated at 700, a volume label, a data type (e.g., database, transaction log, etc.), and/or a size of the volume to be replicated may be received. At 710, rules from priority.xml 224 may be determined. Step 715 may determine a "minimum" (e.g., "least expensive") resource (e.g., storage spaces 130 and/or storage devices 105) allocation for the current volume to be replicated. For example, step 715 may include various steps for each storage type for the data type may be performed in a bottom up fashion. Further details of 715 are illustrated in FIG. 12, according to various embodiments.

In various embodiments, if steps 700-715 succeed in finding an "inexpensive" or "minimal" volume configuration for every volume to be replicated, then an "improvement pass" may be performed with steps 700-710 and 716-717. The improvement pass may go through one volume to be replicated at a time, release all the reserved storage space(s) for that volume from SuggestedLayout.xml 226, and then it may attempt to create a volume suggestion starting with the "most expensive" volume types, and working its way to the "least expensive". This will produce at least as good of a layout as the starting layout, and the layout may be improved.

Figure 13:
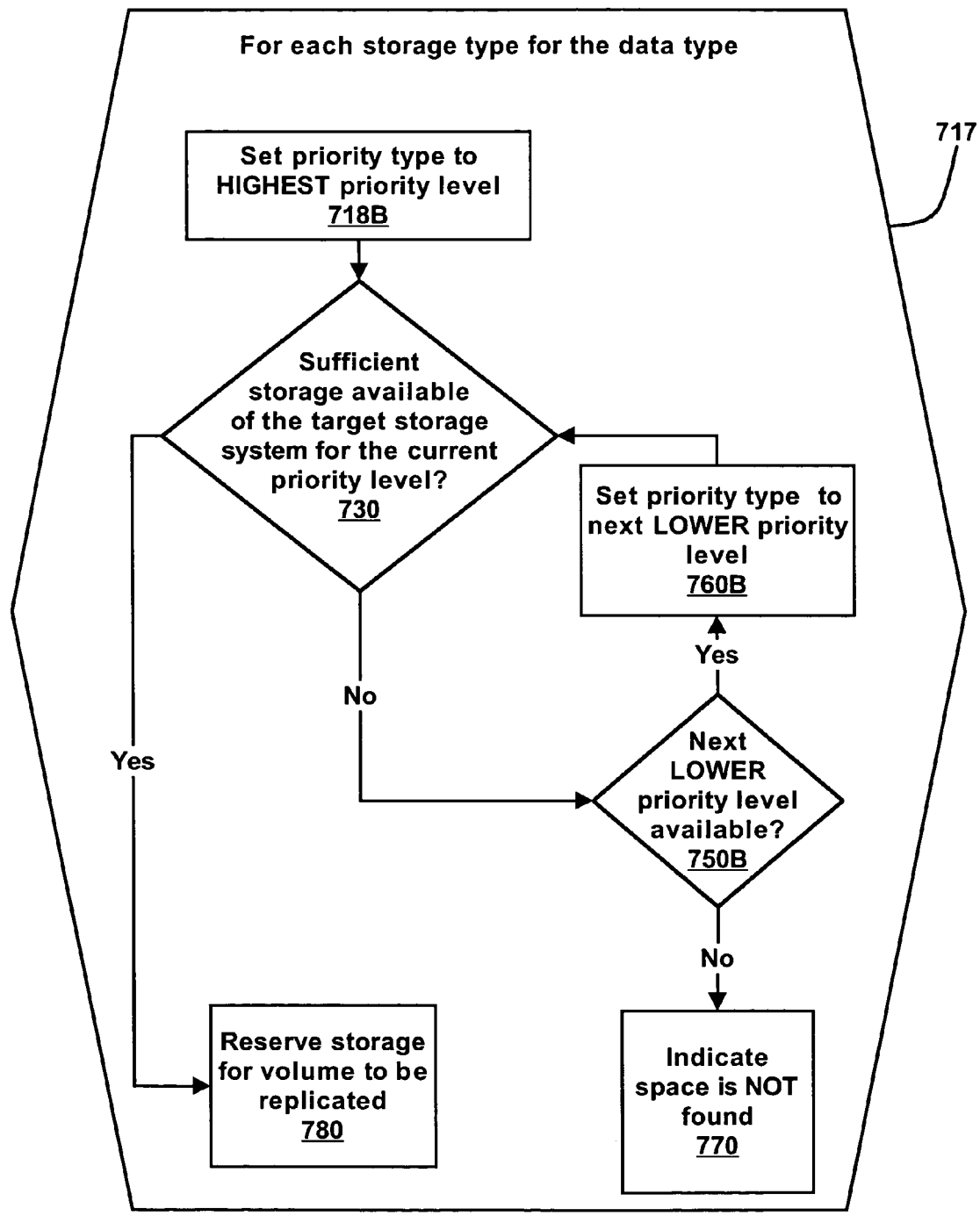
FIG. 13 illustrates a flowchart for searching in a "top down" fashion, according to various embodiments.
Figure 14A:
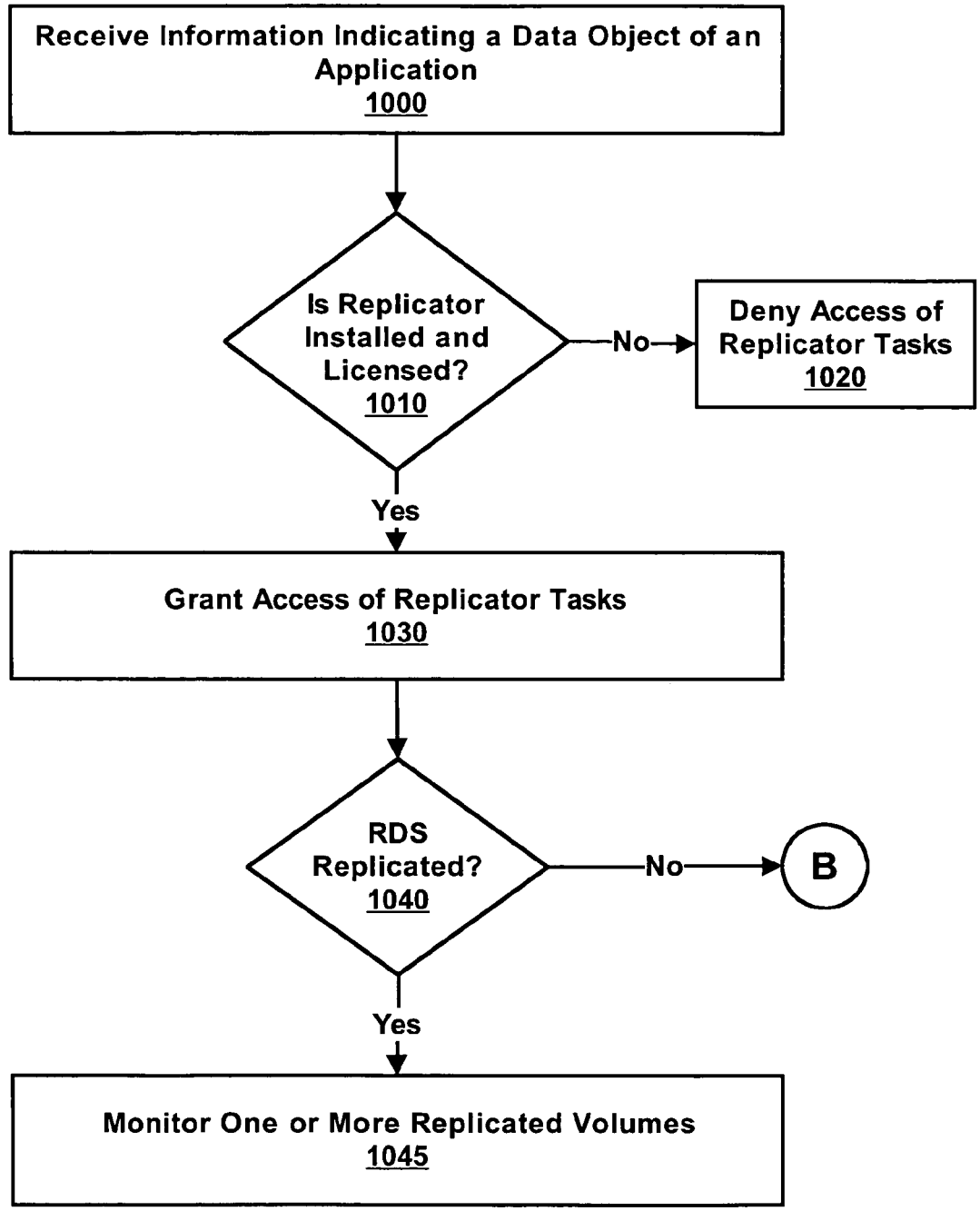
FIGS. 14A-14H illustrate a flowchart for replicating storage of a source storage system, according to various embodiments.
Figure 14B:
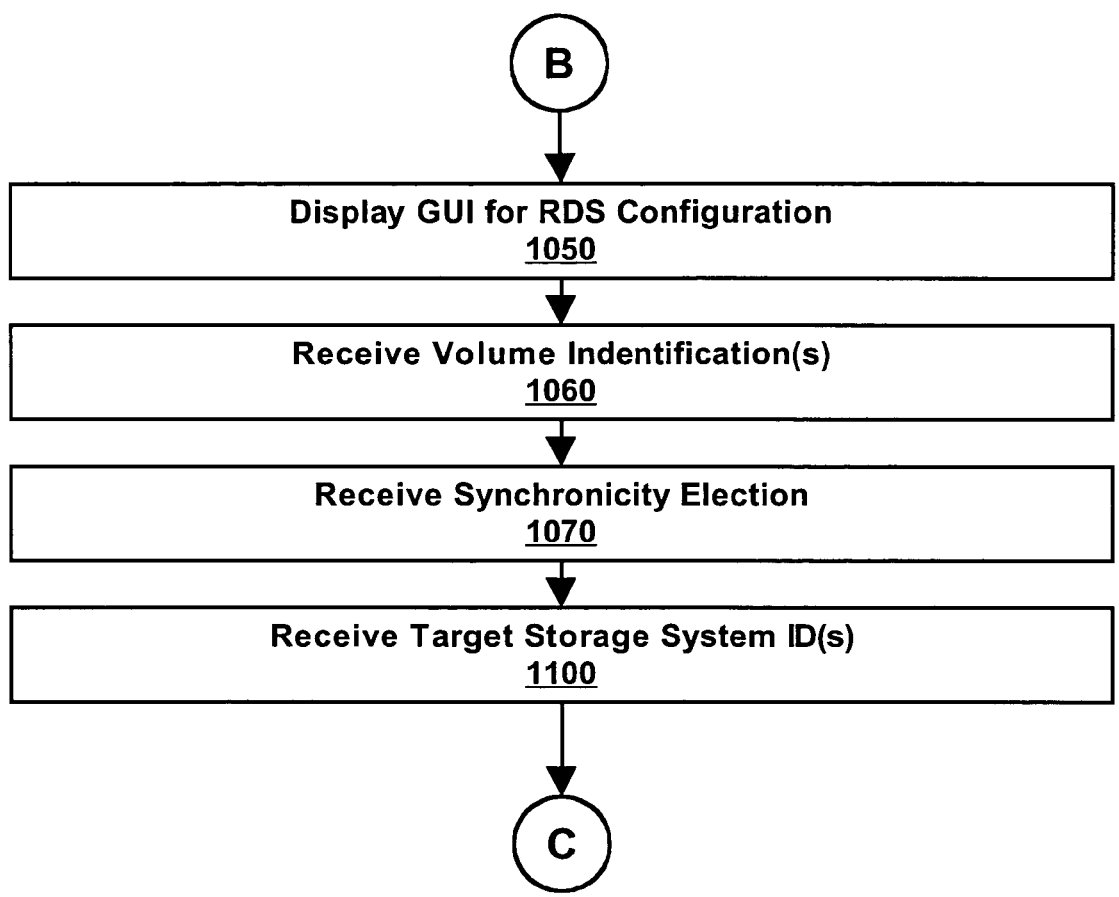
Figure 14C:
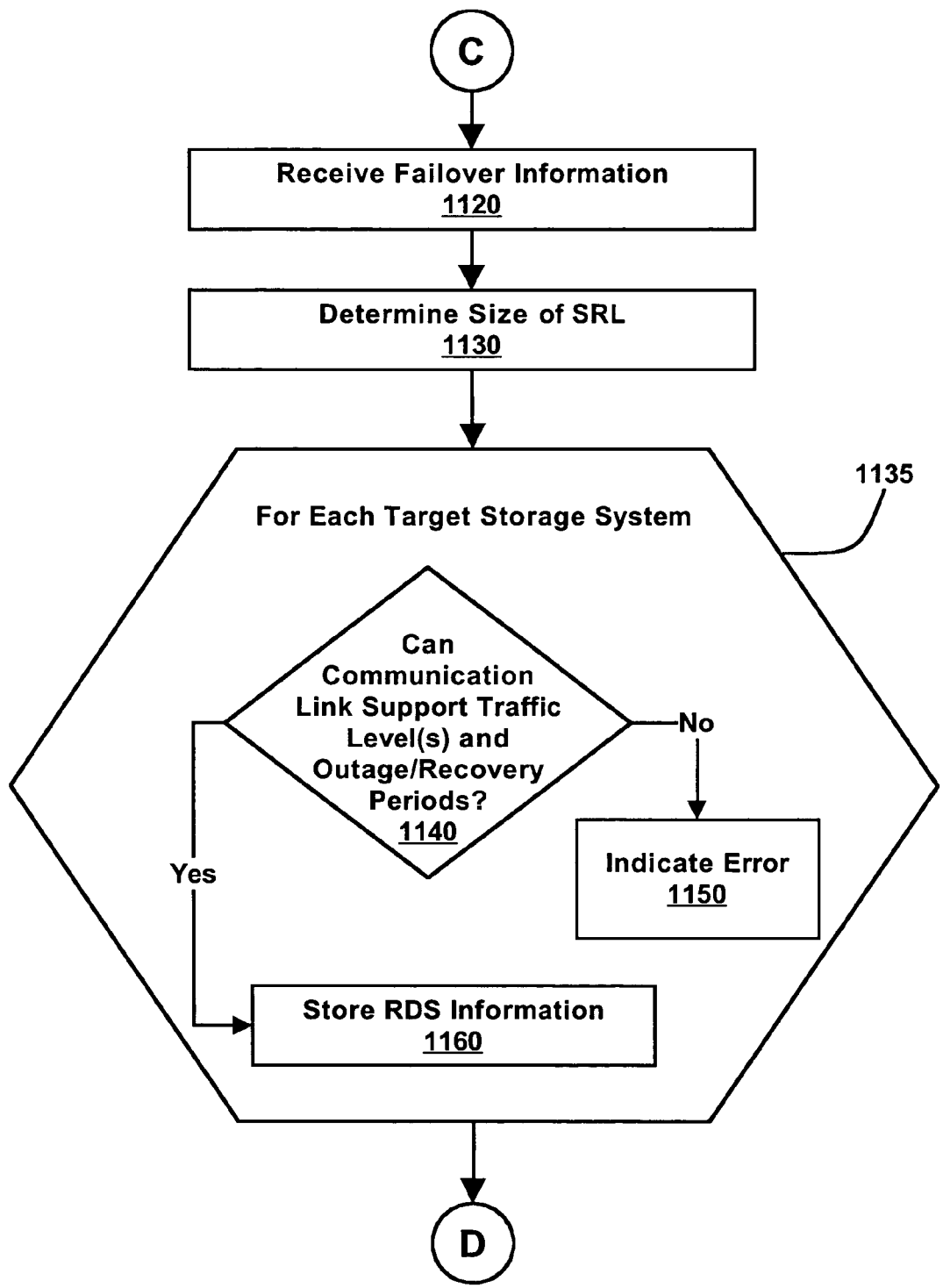
Figure 14D:
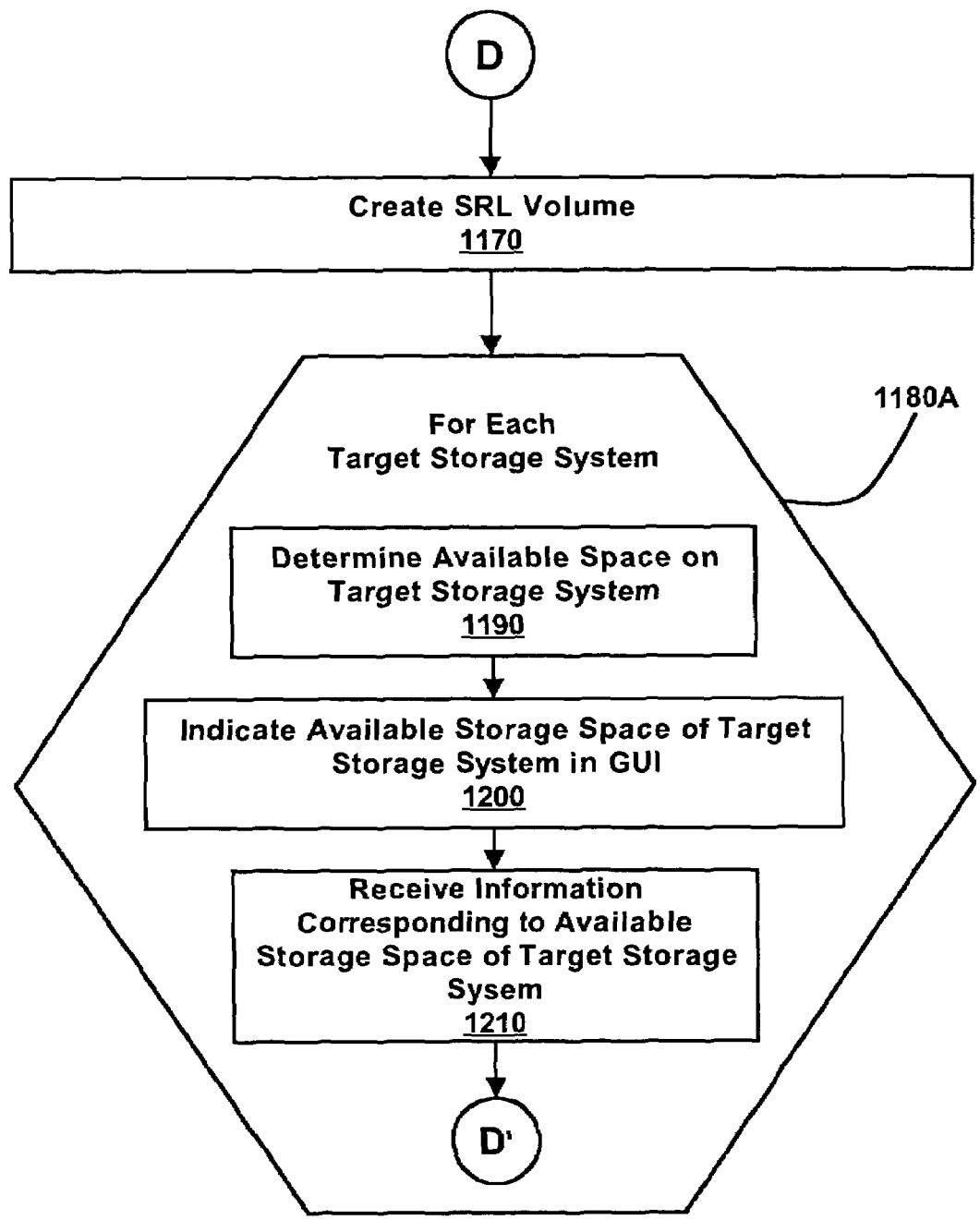
Figure 14E:
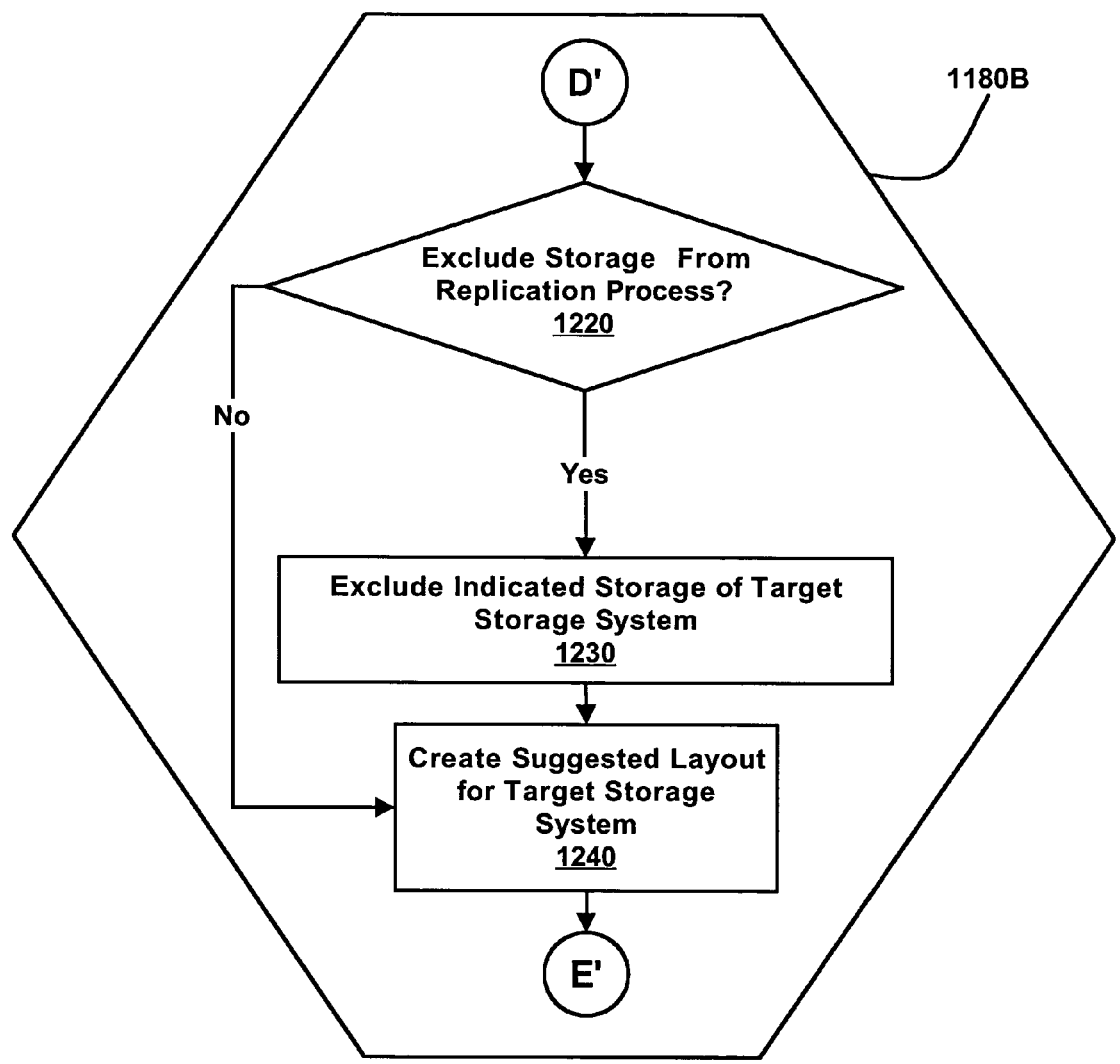
Figure 14F:
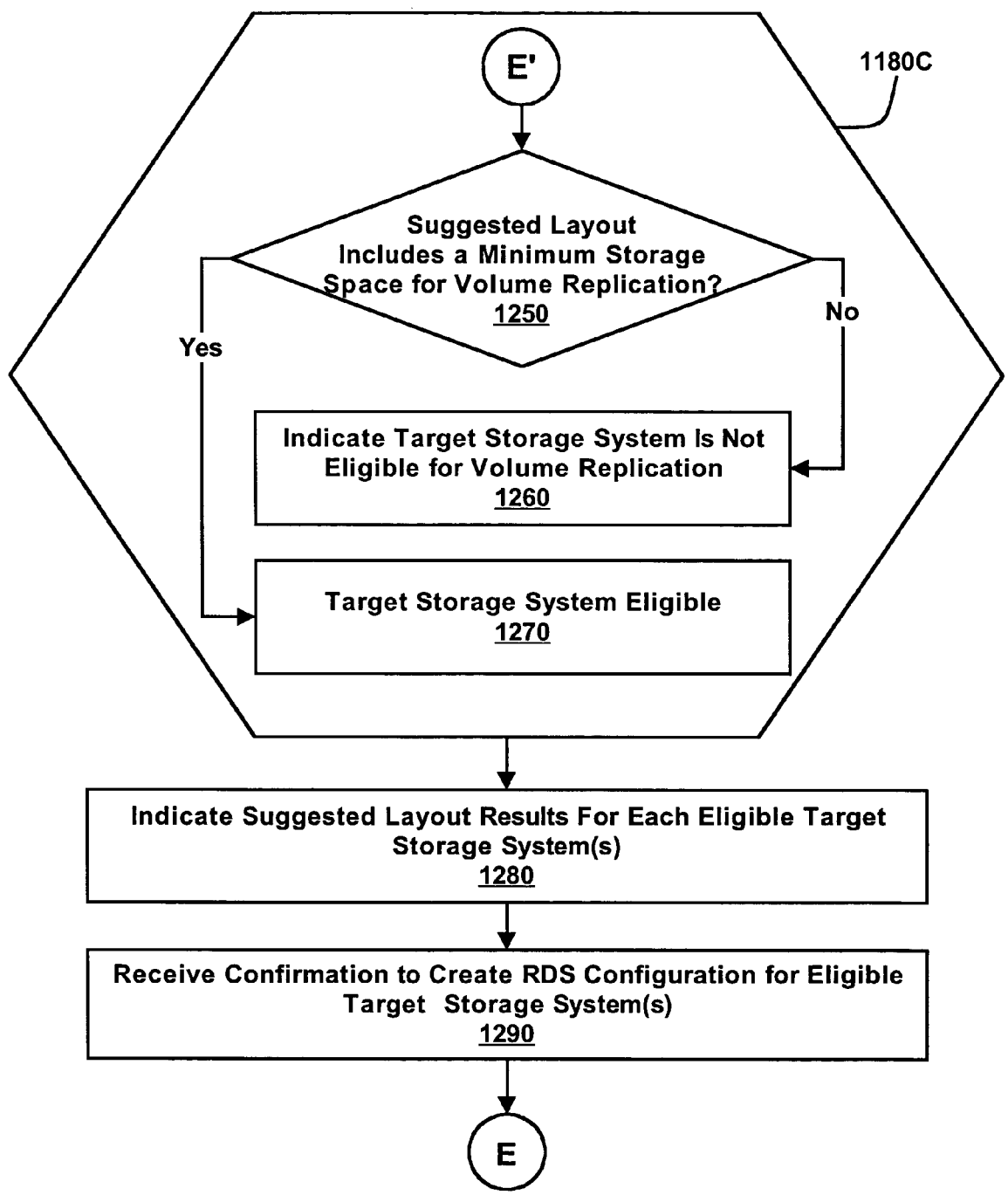
Figure 14G:
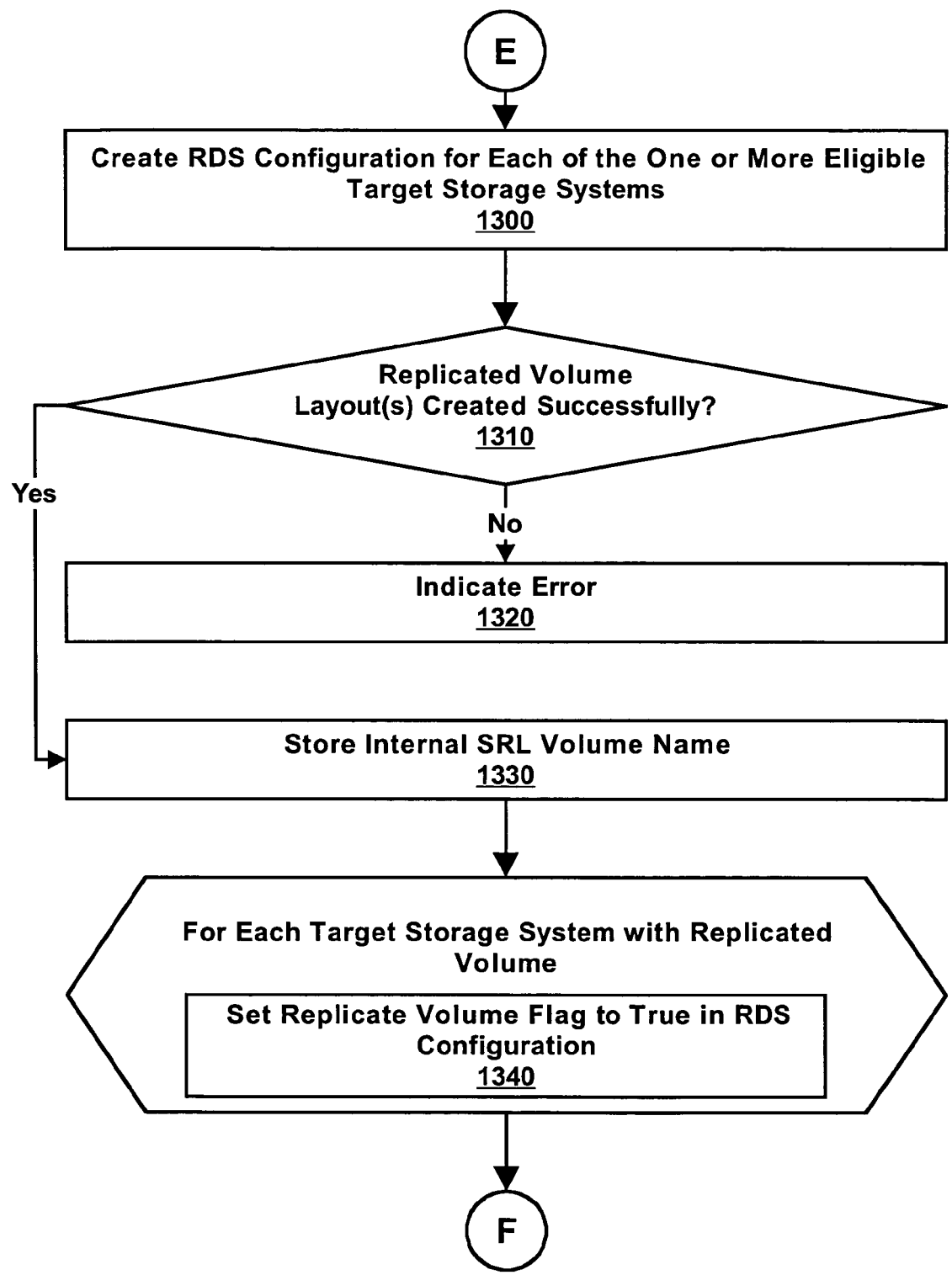
Figure 14H:
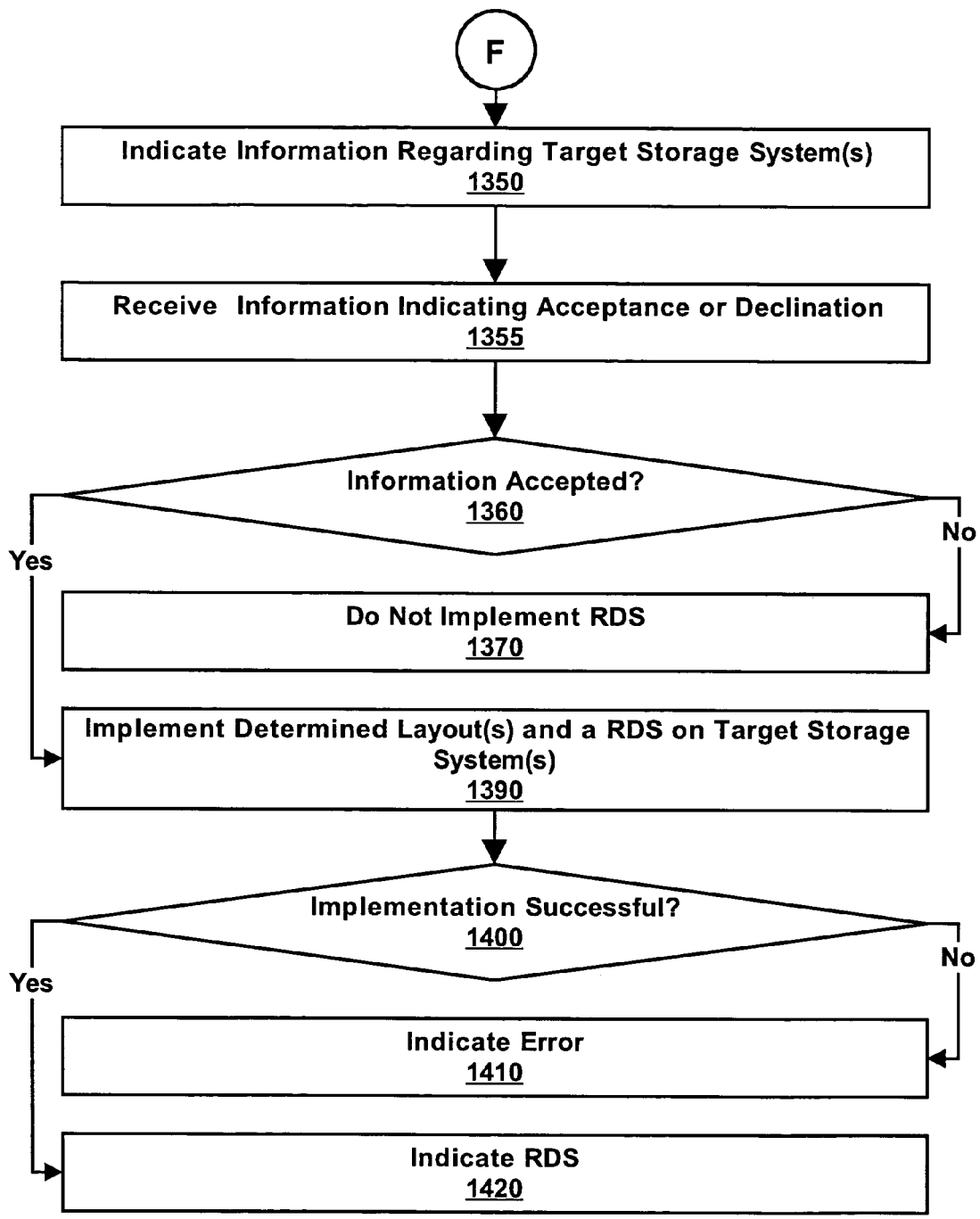

As indicated, steps 700-710 may be performed again for each volume to be replicated. At 716, one or more resources (e.g., storage space(s) 130 and/or storage device(s) 105) may become "unreserved" (i.e., not allocated for the current volume to be replicated). This may allow for different configurations or layouts to be determined. In various embodiments, step 717 may determine a "maximal" (e.g., "most expensive") resource (e.g., storage spaces 130 and/or storage devices 105) allocation for the current volume to be replicated. For example, step 717 may include various steps for each storage type for the data type may be performed in a top down fashion. Further details of 717 are illustrated in FIG. 13, according to various embodiments.

Figure 12:
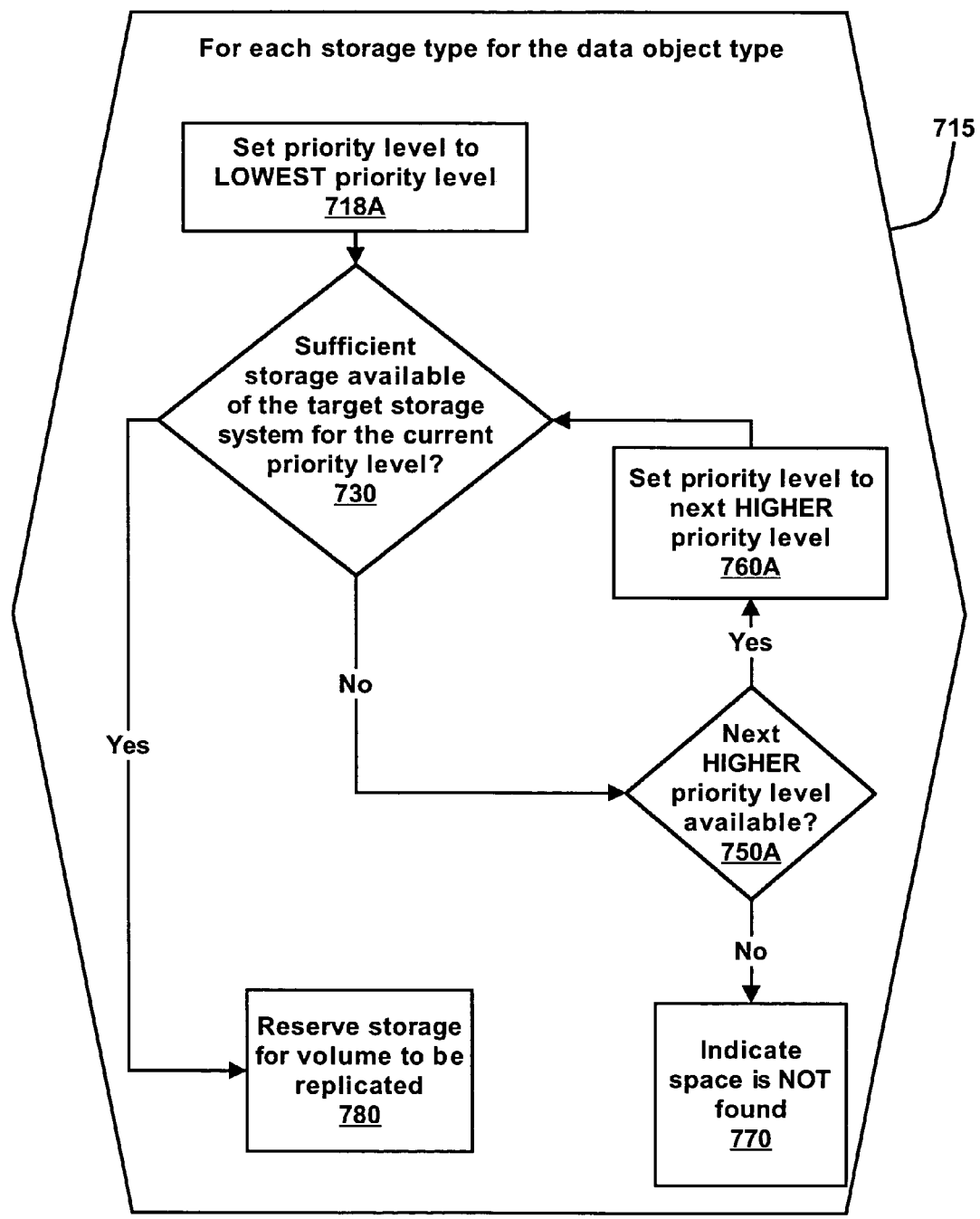
FIG. 12 illustrates a flowchart for searching in a "bottom up" fashion, according to various embodiments.

FIG. 12—Bottom Up Search

FIG. 12 illustrates a flowchart for searching in a "bottom up" fashion which provides more details of 715 of FIG. 11, according to various embodiments. It is noted that in various embodiments one or more of the method elements may be performed concurrently, in a different order, or be omitted. Additional elements may be performed as desired.

In various embodiments, 715 may use rule information from priority.xml 224. More specifically, 715 may use information from one or more storage types 660 (e.g., 660A-660I) of an application data object type 650 for configuring a layout for the volume to be replicated. The priority levels or relative preferences may be determined by some metric. For example, a metric may be that a lower integer value for a priority index (e.g., a priority index of a storage type 660) is associated with a lower priority level, when two or more priority levels are available.

As indicated at 718A, a priority level may be set to a "lowest" possible priority level available from priority.xml 224. For example, the lowest possible priority level may be indicated by a priority index of 0. For instance, storage type 660A may be included in priority.xml 224 and may include a priority index of 0.

In various embodiments, two or more data object types 650 may be included in the volume to be replicated. The two or more data object types 650 may not have a common lowest priority level. If the two or more data object types 650 do not have a common lowest priority level, various methods and/or systems may be used to determine a lowest priority level to use. For example, a greatest lower bound may be used. For instance, the greatest (e.g., highest) priority index of each lowest priority levels may be used for the "lowest" possible priority level available.

At 730, it may be determined if storage space for the volume to be replicated is available. In various embodiments, determining available storage for the currently set priority level may include searching FreeSpace.xml 222 for free space available in FreeSpace.xml 222 which is not already reserved for another volume to be replicated. If space is available for the volume to be replicated, storage space may be reserved at 780. For example, the space may be reserved in the intermediate form of the SuggestedLayout data structure (e.g., SuggestedLayout.xml 226) discussed above. If space is not available for the volume to be replicated, it may be determined if a next higher priority level is available, as indicated at 750A. If a next higher priority is not available, then it may be indicated that storage space is not found for the current volume to be replicated at 770. If a next higher priority is available, then the current priority level may be set to the next higher priority level, as indicated at 760A, and the method may proceed to 730.

FIG. 13—Top Down Search

FIG. 13 illustrates a flowchart for searching in a "top down" fashion which provides more details of 717 of FIG. 11, according to various embodiments. It is noted that in various embodiments one or more of the method elements may be performed concurrently, in a different order, or be omitted. Additional elements may be performed as desired.

In various embodiments, step 717 may use rule information from priority.xml 224. More specifically, 717 may use information from one or more storage types 660 (e.g., 660A-660I) of an application data object type 650 for configuring a layout for the volume to be replicated. As above, the priority levels or relative preferences may be determined by some metric. For example, as discussed above, a metric may be that a lower integer value for a priority index (e.g., a priority index of a storage type 660) is associated with a lower priority level, when two or more priority levels are available.

In some embodiments, two or more data object types 650 may be included in the volume to be replicated. The two or more data object types 650 may not have a common highest priority level. If the two or more data object types 650 do not have a common highest priority level, various methods and/or systems may be used to determine a highest priority level to use. For example, a greatest upper bound may be used. For instance, the greatest (e.g., highest) priority index of each highest priority levels may be used for the "highest" possible priority level available.

As indicated at 718B, a priority level may be set to a "highest" possible priority level available from priority.xml 224. For example, the highest possible priority level may be indicated by a priority index of 20. For instance, storage type 660I may be included in priority.xml 224 and may include a priority index of 20.

At 730, it may be determined if storage space for the volume to be replicated is available. In various embodiments, determining available storage for the currently set priority level may include searching FreeSpace.xml 222 for free space available in FreeSpace.xml 222 which is not already reserved for another volume to be replicated. If space is available for the volume to be replicated, storage space may be reserved at 780. For example, the space may be reserved in the intermediate form of the SuggestedLayout data structure (e.g., SuggestedLayout.xml 226) discussed above. If space is not available for the volume to be replicated, it may be determined if a next lower priority level is available, as indicated at 750B. If a next lower priority is not available, then it may be indicated that storage space is not found for the current volume to be replicated at 770. If a next lower priority is available, then the current priority level may be set to the next lower priority level, as indicated at 760B, and the method may proceed to 730.

FIG. 14—Replicating Storage

FIGS. 14A-14H illustrate a flowchart for replicating storage of a source storage system, according to various embodiments. It is noted that in various embodiments one or more of the method elements may be performed concurrently, in a different order, or be omitted. Additional elements may be performed as desired.

As indicated at 1000, a request to replicate a data object of an application from a source storage system (e.g., storage system 100A) to one or more target storage systems (e.g., storage systems 100B-100I) may be received. In various embodiments, the data object of the application is stored on a volume of the source storage system 100A. For example, a user may click on the data object (e.g., comprised in storage system 100A) of the application, such as a storage group of an Exchange Server display. At 1010 it may be determined if a volume replicator (e.g., VR 175) is installed and/or licensed. If not, access of replicator tasks and/or services may be denied at 1020. If the replicator is installed and licensed, access to execution of replicator tasks and/or services may be granted, as indicated at 1030.

The volume which comprises the data object may be included in a replicated data set (RDS). In other words, the volume comprising the data object may already be replicated. As indicated at 1040, it may be determined if the volume may be included in a RDS. If so, one or more replicated volumes may be monitored, as indicated at 1045.

For example, VR Provider 173 may provide various information for monitoring the one or more replicated volumes. In some embodiments, VR 173 may provide various functionalities which include adding a new replicated volume to an existing RDS. If the volume is not included in a RDS (e.g., the volume is not replicated), a RDS may be configured to replicate the volume to one or more target storage systems 100.

In some embodiments, the RDS may be configured through a GUI (graphical user interface), such as Administrator GUI 152. As indicated at 1050, the GUI may be displayed to configure the RDS. At 1060, one or more volume identifications (IDs) of one or more volumes comprised in source storage system 100A may be received. At 1070, an election of synchronous or asynchronous replication for the RDS may be received. Storage of source storage system 100A may be replicated to two or more target storage systems 100B-100I. One or more IDs of target storage systems 100B-100I may be received at 1100. For example, an ID of each target storage system may include a network ID. In some embodiments, the RDS may be configured with various rules and/or plans which may be used and/or executed if source storage system 100A should fail and/or become unavailable. Failover profile information (e.g., various rules and/or plans) may be received at 1120.

As indicated at 1130, a size of a storage replication log (SRL) may be determined. In some embodiments, VR Provider 173 may be used to determine and/or specify the size of the SRL based on the one or more volume IDs specified received in 1060, the election of synchronous or asynchronous replication received in 1070, and/or the one or more IDs of target storage systems received in 1100, among other information. The SRL may be stored on the source storage system 100A and may include information associated with operations of the RDS. In some embodiments, the RDS may include all volumes that are replicated and the SRL. The SRL may include information about all data modification (e.g., write, remove, create, rename, etc.) operations of all volumes of the RDS in sequence. The SRL may further include information about all data modification operations of all volumes of the RDS for the source storage system 100A and one or more target storage systems 100B-100I.

For example, the SRL may be used as a "re-do" log for the RDS. The SRL may ensure recoverability and the capability of delivering data to target storage systems 100B-100I (e.g., secondary storage systems) with write order fidelity. For instance, as requests for data modification operations are received, the first action may be to write them synchronously to the SRL. The data modification operations may be then sent to any synchronous target storage system (e.g., storage systems 100B-100C), to a storage device 105 of source storage system 100A, and then to any asynchronous target storage system (e.g., storage systems 100D-100I). The storage device 105 of source storage system 100A may respond with completion information. One or more of the target storage systems 100B-100I may respond with a network acknowledgement upon receipt of the data (e.g., data modification operation), then perform the data modification operation and send a data acknowledgement to the source storage system 100A. One or more target storage systems 100B-100I may examine a check sum value and/or a sequence numbering before performing the data modification operation and then send an acknowledgement to the source storage system 100A. The completion information from storage device 105 of source storage system 100A and the acknowledgment from one or more target storage systems 100B-100I may be used to update the SRL with last known completions of data modification operations.

At 1135, steps 1140-1160 may be performed for each target storage system (e.g., storage systems 100B-100I). It may be determined if a communication link (e.g., a coupling) between source storage system 100A and the target storage system (e.g., one of 100B-100I) may support volume replication between source storage system 100A and the target storage system, as indicated at 1140. Determining if the communication link may support volume replication between the two storage systems may include determining if the communication link may support outage and/or recovery periods between the two storage systems. For example, the user may provide a speed of the communication link through the GUI, and VR Provider 173 may determine if the communication link may support volume replication between the two storage systems using the communication link. If the link may not support volume replication between the two storage systems, an error may be indicated, at 1150. In some embodiments, the method may not proceed past 1150 if the link may not support volume replication. If the link may support volume replication between the two storage systems, RDS information associated with source storage system 100A and the target storage system may be stored, at 1160, and a SRL volume may be created at 1170.

At 1180 (including 1180A-1180C), steps 1190-1270 may be performed for each target storage system (e.g., storage systems 100B-100I). As indicated at 1190, available storage space on the target storage system may be determined. The available storage space may be determined using one or more systems and/or methods described herein. The available storage space of the target storage system may be indicated in the GUI, at 1200. For example, one or more portions of the available storage space of the target storage system may be indicated by an icon, such as an icon representing a storage device (e.g., storage device 105). At 1210, information may be received regarding the available storage space of the target storage system. The information received regarding the available storage space of the target storage system (e.g., storage system 100B) may include one or more storage spaces 130 (e.g., 130C-130G) and/or storage devices 105 (e.g., 105C-105F) to include in volume replication for the target storage system.

In various embodiments, the information received regarding the available storage space of the target storage system (e.g., storage system 100B) may include one or more one or more storage spaces 130 (e.g., 130C-130G) and/or storage devices 105 (e.g., 105C-105F) to exclude from volume replication for the target storage system. At 1220, it may be determined if the information received regarding the available storage space of the target storage system may include one or more portions of available storage space to exclude from volume replication for the target storage system. If the information received regarding the available storage space of the target storage system includes storage space to exclude from volume replication for the target storage system, then the indicated storage space may be excluded from volume replication for the target storage system, at 1230, and a suggested layout for the target storage system may be created (e.g., determined), at 1240. If the information received regarding the available storage space of the target storage system does not include one or more portions of available storage space to exclude from volume replication for the target storage system, then a suggested layout for the target storage system may be created, at 1240.

As indicated at 1250, it may be determined if the suggested layout for the target storage system includes a minimum storage space for volume replication. If the suggested layout for the target storage system does not include a minimum storage space for volume replication, the target storage system may not be eligible for volume replication, and it may be indicated that the target storage system is not eligible for volume replication at 1260. It may be indicated through the GUI that the target storage system is not eligible for volume replication. If the suggested layout for the target storage system includes a minimum storage space for volume replication, the target storage system may be eligible for volume replication.

In some embodiments, content of the GUI may indicate each target storage system which is eligible for volume replication, at 1280. Confirmation may be received to create a RDS configuration (including volume layout) for each eligible target storage system, as indicated at 1290. The confirmation may be received through the GUI. As indicated at 1300, a RDS configuration may be created for each of the eligible target storage systems. For example, a RDS configuration may be created for each of the eligible target storage systems in an automatic (i.e. programmatic) fashion. In some embodiments, the method may automatically create a RDS configuration (including volume layout) for each eligible target storage system, possibly without displaying the RDS configurations and/or without receiving any acceptance from the user.

It may be determined if a volume layout(s), i.e. configuration(s), for volume replication was created successfully, as indicated at 1310. If the volume layout(s) for volume replication was not created successfully, an error may be indicated, at 1320. For example, content of the GUI may indicate one or more errors for one or more unsuccessful volumes. If the volume layouts(s) for volume replication was created successfully, an internal SRL volume name on each target storage system may be stored, as indicated at 1330. In various embodiments, a SRL volume may be used on a target storage system if source storage system 100A should failover to the target storage system.

In some embodiments, one or more applications may use a flag to determine if a volume used for a data object is a replicated volume. For example, one or more applications may read the flag and determine if the volume is used in volume replication. If the flag indicates that the volume which comprises the data object is used in volume replication, the one or more applications may only read data (and not write data) from the data object comprised the replicated volume. As indicated at 1340, a replication flag may be set in the RDS configuration for each replicated volume on each eligible target storage system.

As indicated at 1350, RDS configuration information regarding each eligible target storage system may be indicated. In some embodiments, the RDS configuration information may include one or more of a RDS ID (e.g., RDS name), a network ID of source storage system 100A, and/or a network ID(s) of target storage system(s), among others. For example, the RDS configuration information may be conveyed through the GUI to the user, and the user may review the RDS configuration information. The GUI may also include an element, such as a dialog box or other element where the user may graphically choose to accept or decline the determined storage layout(s) and the RDS configuration information. The user may input information (e.g., clicking on a portion of the GUI) to indicate an acceptance or declination, and the acceptance or declination may be received, as indicated at 1355. It may be determined if the information is accepted, at 1360. If the information is not accepted, the determined storage layout(s) and a RDS for each eligible target storage system may not be implemented, as indicated at 1370. If the information is accepted, then at 1390 the determined storage layout(s) and a RDS for each eligible target storage system may be implemented. For example, VR Provider 173 may direct VR 175 to implement the determined storage layout(s) and a RDS based on the RDS configuration information for each eligible target storage system. In some embodiments, the method may automatically implement the determined storage layouts and a RDS based on the RDS configuration information for each eligible target storage system 100B, without receiving any acceptance from the user.

At 1400, it may be determined if an RDS was implemented successfully for each eligible target storage system. Determining if a RDS was implemented successfully for each eligible target storage system may include examining each eligible target storage system, and examining each eligible target storage system may include querying volume replicator software (e.g., VR 175) on each eligible target storage system. For example, VR Provider 173 may communicate with VR 175 and direct VR 175 to determine information associated with the replicated volumes on each eligible target storage system. After determining the information associated with the replicated volumes on each eligible target storage system, VR 175 may communicate the information to VR Provider 173, and VR Provider may provide the information the GUI and/or other software components.

If the replication data sets (including replicated volumes) were not implemented successfully, an error may be indicated, at 1410. For example, content of the GUI may indicate an error for each eligible target storage system and/or an error for each unsuccessful RDS and/or unsuccessful volume. If the RDSs (including replicated volumes) were created successfully, each RDS may be indicated at 1420. For example, an icon for each eligible target storage system and/or an icon for each RDS of each eligible target storage system may be displayed through the GUI.

Initial System Setup/Deployment and Replication

Various system administrators (e.g., users) may create various configurations on a storage system for various applications, including Microsoft Exchange, Microsoft SQL Server, Oracle Database, etc. The system administrators may use software to automatically (i.e., programmatically) determine and implement a storage configuration for source (e.g., primary) storage system 100A for a certain software application. For more information on configuring server applications, please see U.S. Patent Application Ser. No. 60/348,870, Ser. No. 10/327,561, and Ser. No. 10/388,193, referenced above. In various embodiments, once the storage configuration for source storage system 100A for the certain software application is determined and implemented, one or more volumes of the storage configuration of the certain software application may be replicated from the source storage system 100A to one or more target storage systems 100B-100I with one or more systems and/or methods described herein.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A memory medium storing program instructions which are computer-executable to:
   receive a request to replicate a storage layout of a first storage system onto a second storage system;
   determine the storage layout of the first storage system;
   determine storage options of the second storage system; and
   determine a storage layout for the second storage system based on the storage options and the storage layout of the first storage system.

2. The memory medium of claim 1,
   wherein, in determining the storage layout for the second storage system, the program instructions are further computer-executable to:
   examine one or more storage devices available to the second storage system.

3. The memory medium of claim 2,
   wherein, in determining the storage layout for the second storage system, the program instructions are further computer-executable to:
   examine available storage space of the one or more storage devices available to the second storage system; and
   determine storage allocations based on the available storage space of the one or more storage devices available to the second storage system and the storage layout of the first storage system.

4. The memory medium of claim 3, wherein at least one of the one or more storage devices available to the second storage system is available through a network.

5. The memory medium of claim 3,
   wherein the storage layout for the first storage system includes one or more volumes to be replicated;
   wherein, in determining the storage allocations, the program instructions are further computer-executable to:
   determine rules from a rules data structure; and
   for each volume to be replicated, iteratively perform:
   determining a minimal storage layout for the volume to be replicated, wherein said determining the minimal storage layout is based on the determined rules; and
   reserving storage space for the volume to be replicated.

6. The memory medium of claim 5,
   wherein, in determining the storage allocations, the program instructions are further computer-executable to:
   for each volume to be replicated, iteratively perform:
   unreserving the storage space for the volume to be replicated; and
   determining a maximal storage layout for the volume to be replicated.

7. The memory medium of claim 1, wherein the program instructions are further computer-executable to:
   implement the storage layout for the second storage system.

8. The memory medium of claim 7,
   wherein the request to replicate the storage layout of the first storage system onto the second storage system includes information indicating one or more volumes for replication.

9. The memory medium of claim 8, wherein the program instructions are further computer-executable to:
   replicate the one or more volumes for replication onto the second storage system.

10. The memory medium of claim 9, wherein the program instructions are further computer-executable to:
    replicate data from the first storage system to the second storage system.

11. The memory medium of claim 9, wherein the program instructions are further computer-executable to:
    detect a change of a volume of the storage layout of the first storage system; and
    replicate the change of the volume of the storage layout of the first storage system to a volume of the storage layout of the second storage system.

12. The memory medium of claim 11,
    wherein, in replicating the change of the volume of the storage layout of the first storage system to the volume of the storage layout of the second storage system, replicating is performed in a synchronous fashion.

13. The memory medium of claim 11,
    wherein, in replicating the change of the volume of the storage layout of the first storage system to the volume of the storage layout of the second storage system, replicating is performed in an asynchronous fashion.

14. The memory medium of claim 1,
    wherein the first storage system is coupled to the second storage system through a network;
    wherein the program instructions are further computer-executable to:
    receive a network identification (ID) associated with the second storage system.

15. The memory system of claim 14, wherein the network ID includes an Internet protocol (IP) address.

16. The memory medium of claim 14, wherein the network ID includes a logical name.

17. The memory medium of claim 14, wherein the program instructions are further computer-executable to:
    implement a graphical user interface (GUI);
    wherein, in receiving network ID associated with the second storage system, the program instructions are further computer-executable to:
    receive the network ID associated with the second storage system through the GUI.

18. The memory medium of claim 1, wherein the program instructions are further computer-executable to:
    implement a graphical user interface (GUI);
    display the storage layout for the second storage system through the GUI; and
    receive user input indicating a confirmation to create the storage layout for the second storage system.

19. The memory medium of claim 1, wherein the program instructions are further computer-executable to:
    receive a request to create a storage layout of the first storage system;
    determine existing storage capabilities in the first storage system;
    receive information regarding an application;
    automatically determine a storage layout for the first storage system based on the existing storage capabilities of the first storage system and the information regarding the application; and implement the storage layout for the first storage system.

20. A system for volume replication comprising:
means for receiving a request to replicate a storage layout of a first storage system onto a second storage system;
means for determining the storage layout of the first storage system;
means for determining storage options of the second storage system; and
means for determining a storage layout for the second storage system based on the storage options and the storage layout of the first storage system;
wherein said means for determining storage options of the second storage system includes:
means for examining one or more storage devices available to the second storage system;
means for examining available storage space of the one or more storage devices available to the second storage system; and
means for determining storage allocations based on the available storage space of the one or more storage devices available to the second storage system and the storage layout of the first storage system.

21. A computer-implemented method for replicating a storage layout of a first storage system onto a second storage system, the method comprising:
receiving a request to replicate a storage layout of a first storage system onto a second storage system;
determining the storage layout of the first storage system;
determining storage options of the second storage system; and
determining a storage layout for the second storage system based on the storage options and the storage layout of the first storage system.

22. The computer-implemented method of claim 21,
wherein said determining the storage layout for the second storage system includes:
examining one or more storage devices available to the second storage system.

23. The computer-implemented method of claim 22,
wherein said determining the storage layout for the second storage system includes:
examining available storage space of the one or more storage devices available to the second storage system; and
determining storage allocations based on the available storage space of the one or more storage devices available to the second storage system and the storage layout of the first storage system.

24. The computer-implemented method of claim 23, wherein at least one of the one or more storage devices available to the second storage system is comprised in the second storage system.

25. The computer-implemented method of claim 23,
wherein the storage layout for the first storage system includes one or more volumes to be replicated;
wherein said determining the storage allocations includes:
receiving information associated with the storage layout of the first storage system;
determining one or more rules from a rules data structure; and
for each volume to be replicated, iteratively performing:
determining a minimal storage layout for the volume to be replicated, wherein said determining the minimal storage layout for the volume to be replicated is based on the determined one or more rules; and
reserving storage space for the volume to be replicated based on said determining the minimal storage layout for the volume to be replicated.

26. The computer-implemented method of claim 25,
wherein said determining the storage allocations includes:
for each volume to be replicated, iteratively performing:
unreserving the storage space for the volume to be replicated;
determining a maximal storage layout for the volume to be replicated; and
reserving storage space for the volume to be replicated based on said determining the maximal storage layout for the volume to be replicated.

27. The computer-implemented method of claim 21, further comprising:
implementing the storage layout for the second storage system.

28. The computer-implemented method of claim 27,
wherein the request to replicate the storage layout of the first storage system onto the second storage system includes information indicating one or more volumes for replication.

29. The computer-implemented method of claim 28, further comprising:
replicating the one or more volumes for replication onto the second storage system.

30. The computer-implemented method of claim 29, further comprising:
replicating data from the first storage system to the second storage system.

31. The computer-implemented method of claim 29, further comprising:
detecting a change of a volume of the storage layout of the first storage system; and
replicating the change of the volume of the storage layout of the first storage system to a volume of the storage layout of the second storage system.

* * * * *